（12）United States Patent
Heiß-Chouquet et al.

(10) Patent No.: US 11,242,283 B2
(45) Date of Patent: Feb. 8, 2022

(54) BENDABLE OR FOLDABLE ARTICLES AS WELL AS METHODS FOR THE PRODUCTION THEREOF

(71) Applicant: Schott AG, Mainz (DE)

(72) Inventors: Markus Heiß-Chouquet, Bischofsheim (DE); Vanessa Hiller, Mainz (DE)

(73) Assignee: Schott AG, Mainz (DE)

( * ) Notice: Subject to any disclaimer, the term of this patent is extended or adjusted under 35 U.S.C. 154(b) by 167 days.

(21) Appl. No.: 16/401,676

(22) Filed: May 2, 2019

(65) Prior Publication Data

US 2019/0337845 A1    Nov. 7, 2019

(30) Foreign Application Priority Data

May 2, 2018   (DE) .................... 10 2018 110 498.7

(51) Int. Cl.
*C03C 21/00*    (2006.01)
*C03C 15/02*    (2006.01)

(52) U.S. Cl.
CPC ............ *C03C 21/002* (2013.01); *C03C 15/02* (2013.01)

(58) Field of Classification Search
None
See application file for complete search history.

(56) References Cited

U.S. PATENT DOCUMENTS

| 8,889,254 | B2 | 11/2014 | Bayne et al. | |
| 2013/0133366 | A1* | 5/2013 | Glaesemann | B24B 1/005 65/29.18 |
| 2016/0229740 | A1 | 8/2016 | Gross | |

FOREIGN PATENT DOCUMENTS

| WO | WO-2014045809 A1 * | 3/2014 | ............ C03C 3/087 |
| WO | 2015/116465 A1 | 8/2015 | |
| WO | WO-2016037343 A1 * | 3/2016 | ......... C03C 23/0025 |

* cited by examiner

*Primary Examiner* — David Sample
(74) *Attorney, Agent, or Firm* — Taylor IP, P.C.

(57) ABSTRACT

An article of transparent and brittle material, such as glass, glass ceramic, ceramic or crystals. The article includes at least one exchange layer and at least one bulk layer. The at least one exchange layer includes at least one kind of cation $ion_I$ with an increased proportion compared to the at least one bulk layer and at least one kind of cation $ion_R$ with a reduced proportion compared to the at least one bulk layer. The article is in particularly used as a display cover for flexible displays or flexible protective foils, for example in smartphones or tablets or TV sets. The article can also be used as a substrate for an electronic component such as an OLED or LED.

11 Claims, 6 Drawing Sheets

BENDABLE OR FOLDABLE ARTICLES AS WELL AS METHODS FOR THE PRODUCTION THEREOF

BACKGROUND OF THE INVENTION

1. Field of the Invention

The present invention relates to bendable and/or foldable articles and their use as well as a method for the production of bendable and/or foldable articles. The articles are of transparent and brittle material, in particularly of glass, glass ceramic, ceramic or crystals. The articles, in particularly, are used as display cover, in particularly for flexible displays, or as flexible protective foils, in particularly as protective covers in displays, for example in smartphones or tablets or TV sets. The articles can also be used as substrate for electronic components such as OLEDs or LEDs.

2. Description of the Related Art

A bendable display is subject to loads which can be divided into three groups:
1) tensile load through the bending,
2) impact loads which, for example, occur through the dropping of the product or the dropping of objects onto the display,
3) loads through scratching, for example with hard objects.

Known articles may not have acceptable load properties. The load properties depend on a whole slew of material parameters and strength parameters such as for example the elastic modulus (Young's modulus), the Poisson number, the fracture toughness, the compression stress, the characteristic depth of penetration, the article thickness, the hardness, the density and the properties in the case of subcritical crack growth. The influence of the different parameters onto the load property is complex. In addition, also between the parameters are versatile interactions.

It is known that the load properties can be improved by chemical tempering. It is also known that a further improvement can be achieved by a material removal from the glass surface obtained by etching after the step of chemical tempering.

WO 2015/116465 A1, for example, discloses glasses having a thickness of 75 μm and depths of exchange (depth of layer, DoL) of about 10 μm as well as a material removal through etching after the step of tempering of 1 to 5 μm. However, these parameters may led to weakened glasses.

What is needed in the art is a bendable display with improved strength parameters.

SUMMARY OF THE INVENTION

The present invention provides articles with increased service life expectancy in the case of load by bending and a method for the production of such articles. Increased service life expectancy means that the article withstands the loads which are mentioned herein for a longer time than an article of prior art. The improved bendability results in the fact that lower radii without fracture can be achieved. Therefore, increased service life expectancy also means that, compared to prior art, the article may have bendability associated with lower radii without fracture. The present invention provides articles and methods for the production of such articles, wherein for the articles according to the present invention in the case of the same probability of failure a higher load (lower bending radius) can be achieved or, the other way round, that in the case of a given load (bending radius) a lower probability of failure can be achieved. The present invention provides articles with increased service life expectancy in the case of impact and/or scratching loads as well as a method for the provision of such articles. In particularly, the invention provides articles and methods for their provision, wherein the articles may have an increased service life expectancy in the case of load through bending and/or in the case of impact loads and/or scratching loads.

The invention, in particular, relates to articles of transparent and brittle material having a thickness d of less than 1.2 mm,
wherein the article comprises at least one exchange layer and at least one bulk layer,
wherein the exchange layer comprises at least one, preferably exactly one kind of cation $ion_I$ with an increased proportion in comparison to the bulk layer and at least one, preferably exactly one kind of cation $ion_R$ with a reduced proportion in comparison to the bulk layer,
wherein the ion radius of $ion_I$ is higher than the ion radius of $ion_R$,
wherein the ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer are such that $$\frac{y \cdot \left(-\ln\left(\frac{4 - 3 \cdot c_{R,surface}}{4}\right)\right)}{\ln\left(\frac{4 - 3 \cdot c_{R,surface}}{4 - 3 \cdot c_{R,inner}}\right)}$$

is higher than 5 μm, and
wherein the ratio $c_{R,surface}$ of the proportion of $ion_R$ at the article surface to the proportion of $ion_R$ in the bulk layer and the ratio of $c_{R,inner}$ of the proportion of $ion_R$ in a depth y of the exchange layer to the proportion of $ion_R$ in the bulk layer are such that $$\frac{y}{\ln\left(\frac{4 - 3 \cdot c_{R,surface}}{4 - 3 \cdot c_{R,inner}}\right)}$$

is higher than 12 μm.

The proportion of $ion_I$ and the proportion of $ion_R$ are the proportions in mol %.

Transparent material in the sense of the present invention may be a material which in the case of a thickness of 2 mm has an internal transmittance of electromagnetic radiation which in a 50 nm broad range, particularly preferably in a 250 nm broad range, within a spectrum of 380 to 800 nm, is higher than 25%, further preferably higher than 60%, further preferably higher than 80%, still further preferably higher than 90%, particularly preferably higher than 95%.

Brittle material can only be bent up to a certain load limit. This depends on a whole slew of material parameters and strength parameters.

Brittle material in the sense of the present invention is may be a material having a brittleness S of more than 0.1 $\mu m^{-1/2}$, further preferably more than 0.2 $\mu m^{-1/2}$, further preferably more than 0.5 $\mu m^{-1/2}$, further preferably more than 0.8 $\mu m^{-1/2}$, further preferably more than 1 $\mu m^{-1/2}$, further preferably more than 1.5 $\mu m^{-1/2}$, further preferably more than 2 $\mu m^{-1/2}$. Preferably, the brittleness S is at most 20 $\mu m^{-1/2}$, further preferably at most 18 $\mu m^{-1/2}$, further preferably at most 15 $\mu m^{-1/2}$, further preferably at most 12 $\mu m^{-1/2}$, further preferably at most 10 $\mu m^{-1/2}$, further preferably at most 9 $\mu m^{-1/2}$, further preferably at most 8 $\mu m^{-1/2}$. Preferably, the brittleness S is in a range of 0.1 $\mu m^{-1/2}$ to 20 $\mu m^{-1/2}$, further preferably of 0.2 $\mu m^{-1/2}$ to 18 $\mu m^{-1/2}$, further preferably of 0.5 $\mu m^{-1/2}$ to 15 $\mu m^{-1/2}$, further preferably of 0.8 $\mu m^{-1/2}$ to 12 $\mu m^{-1/2}$, further preferably of 1 $\mu m^{-1/2}$ to 10 $\mu m^{-1/2}$, further preferably of 1.5 $\mu m^{-1/2}$ to 9 $\mu m^{-1/2}$, further preferably of 2 $\mu m^{-1/2}$ to 8 $\mu m^{-1/2}$. Here, brittleness S means the ratio of the Vickers hardness H and the fracture toughness $K_{Ic}$:

$$S=H/K_{Ic}$$

In the explanations given in "Lawn, B. R.; Marshall D. B.; «*Hardness, Toughness, and Brittleness: An Indentation Analysis*»; *Journal of the American Ceramic Society* (1979)" this ratio is used as a measure for brittleness. A person skilled in the art knows how to experimentally determine this brittleness. The brittleness may be determined according to the explanations given in "Sehgal, J.; Ito, S.; «*Brittleness of glass*»; *Journal of Non-Crystalline Solids* (1999)".

The transparent and brittle material may be selected from the group consisting of glass, glass ceramic, ceramic and crystals. Crystals may be selected from the group consisting of sapphire, diamond, corundum, ruby, topaz, quartz and orthoclase. Sapphire is a particularly preferable crystal. Particularly preferably, the transparent and brittle material is a glass or a glass ceramic, especially preferably a glass. Especially preferably, the transparent and brittle material is a borosilicate glass, an aluminosilicate glass or an aluminoborosilicate glass. Preferably, the proportion of $Li_2O+Na_2O$ in the materials according to the present invention, in particularly in glasses according to the present invention is higher than 1% by weight, further preferably higher than 3% by weight, further preferably higher than 5% by weight. In particularly preferable embodiments the material according to the present invention, in particular the glass according to the present invention, contains $Na_2O$, but however it is free of $Li_2O$, $Rb_2O$ and $Cs_2O$. When in this description is mentioned that the materials, in particularly glasses are free of a component or that they do not contain a certain component, then this means that this component may only be present in the materials or glasses as an impurity. This means that it is not added or contained in substantial amounts. According to the present invention, not substantial amounts are amounts of lower than 1000 ppm, preferably lower than 500 ppm and most preferably lower than 100 ppm.

The article may have an elastic modulus of 40,000 to 110,000 MPa, further preferably of 50,000 to 100,000 MPa, further preferably of 60,000 to 90,000 MPa, further preferably of 61,000 to 80,000 MPa. It was shown that such an article may have particularly advantageous bending properties.

The article may have a Poisson number of 0.1 to 0.4, further preferably of 0.14 to 0.36, further preferably of 0.18 to 0.32. It was shown that such an article may have particularly advantageous bending properties.

The article may have a density of 1000 kg/m³ to 5000 kg/m³, further preferably of 1500 kg/m³ to 4500 kg/m³, further preferably of 2000 kg/m³ to 4000 kg/m³. The density should not be too high, so that the articles can be handled easily. But on the other hand, the density should also not be too low, because otherwise optical properties such as for example the refractive index may be influenced in a negative manner.

Typically, the article generally has six lateral faces, wherein two of them each are opposite to each other. Thus, there are three pairs of lateral faces being opposite to each other. The distances between the lateral faces being opposite to each other are referred to as length l, width b and thickness d, wherein the length l denotes the distance of the lateral faces being opposite to each other with the highest value and the thickness d denotes the distance of the lateral faces being opposite to each other with the lowest value. Typically, the values of the length l and the width b of the article are considerably higher than the value of its thickness d. The values of the length l and/or the width b may be at least 10 times, further preferably at least 20 times, further preferably at least 50 times, further preferably at least 100 times, further preferably at least 200 times the value of the thickness d. Thus, the articles are preferably flat articles which can also be described as disc- or foil- or plate-like. In particularly, the articles are no fibers.

The lateral faces the distance of which is described as article thickness d, typically, are considerably larger than the other lateral faces. Therefore, the lateral faces the distance of which is described as article thickness d can also be referred to as lateral main faces or main faces or main sides of the articles. Then, the article thickness d is the distance between both main faces of the article. Both main faces are substantially oriented in a parallel manner to each other so that the article thickness d is substantially constant over the whole extent of the article. Being substantially constant preferably means that the difference between the largest distance of both main faces and the smallest distance of both main faces is at most 10%, further preferably at most 5% of the largest distance of both main faces. Particularly preferably, the article thickness d is the average distance of both main faces.

An article according to the present invention may have a thickness d of less than 1.2 mm. Preferably, the thickness d of the article is at most 700 $\mu m$, further preferably at most 550 $\mu m$, further preferably at most 350 $\mu m$, further preferably at most 200 $\mu m$, further preferably at most 100 $\mu m$, further preferably at most 70 $\mu m$, further preferably at most 50 $\mu m$, further preferably at most 25 $\mu m$. Low thicknesses are associated with an increased bendability. However, the article thickness d is preferably at least 1 $\mu m$, more preferably at least 2 $\mu m$, for achieving an advantageous stability.

Chemical tempering (also referred to as chemical hardening or chemical strengthening or chemical toughening) involves an exchange of smaller ions at the article surface with larger ions so that a compression stress layer is created. Normally, this exchange comprises a removal of $Na^+$ ions from the article and an introduction of $K^+$ ions into the article. But however, the tempering must not necessarily involve an exchange of $Na^+$ with $K^+$. For example, it is also possible to replace $Li^+$ ions with $Na^+$ ions. Also multi-step exchange processes are possible, for example, in a first step an exchange of $Li^+$ with $Na^+$ and in a second step an exchange of $Na^+$ with $K^+$. Also an exchange of smaller alkaline earth metal ions with larger alkaline earth metal ions is possible. Essential in this connection is only that through the exchange of smaller ions with larger ions a compression stress layer is created so that a chemically tempered article, in particularly a chemically tempered glass is obtained. Through the tempering in the article an exchange layer is created which due to the compression stress being connected therewith can also be referred to as compression stress layer.

On each side of the article an exchange layer may be present. Between both exchange layers the bulk layer is present which is also referred to as bulk glass layer, when the article is a glass. The invention also comprises embodiments with only one exchange layer.

In the exchange layer, in comparison to the bulk, the composition of the article is changed. In particularly, in the exchange layer the proportion of at least one, preferably exactly one ion species, in comparison to the bulk, is increased and the proportion of at least one, preferably exactly one ion species, in comparison to the bulk, is reduced. Particularly preferably, the exchange layer, in comparison to the bulk layer, has a lower proportion of $Na^+$ ions and a higher portion of $K^+$ ions. Thus, preferably, the exchange layer(s) are the regions of the article in which the composition of the article has been changed by the chemical tempering in comparison to the starting glass. In contrast thereto, the bulk layer is preferably the region of the article the composition of which has not been changed by the chemical tempering. This, of course, only applies to embodiments in which a region with a composition which has not been changed by the chemical tempering is present. Generally speaking, the bulk layer is the region of the article (in particularly of the glass) in which the proportion of $ion_R$ reaches a maximum and accordingly the proportion of $ion_I$ reaches a minimum. Conversely, the exchange layer(s) are the regions in which, in comparison to the bulk, the proportion of $ion_R$ is reduced and the proportion of $ion_I$ is increased.

As a consequence of the process of chemical hardening the proportions of the ions which are part of the exchange process within the exchange layer are not evenly distributed over the whole thickness of the layer. Rather, there is a gradient each from the article surface into the direction of the bulk layer. For the ions with increased proportions in the exchange layer, in comparison to the bulk layer, the highest proportion with respect to the article composition is reached at the article surface. Then, into the direction of the center it decreases. In the case of the ions with reduced proportions in the exchange layer, in comparison to the bulk layer, this is exactly the other way round. Their proportion reaches the lowest value at the article surface and then increases into the direction of the center.

Thus, the exchange layer and the bulk layer should not be considered as layers which are separated from each other. Rather, the respective terms should only express that in the article regions are present in which as a consequence of the exchange process the proportions of single ion species have considerably be increased or decreased (the at least one exchange layer), while the proportions of the corresponding ions in other regions of the article have not been changed or have only been changed in a small extent by the exchange process (the bulk layer). As described below, the proportion of the ions which are involved in the exchange process in the exchange layer asymptotically approaches the respective proportion in the bulk layer, so that it is difficult to exactly define the position of the transition of the exchange layer into the bulk layer. Therefore, it is common not to mention an exact value of the depth of the exchange layer, but instead of that to characterize the extent of the exchange in another way. According to the present invention, the characteristic depth of penetration $x_c$ described below in detail is used in this connection. At a depth of $x=2*x_c$ apart from negligible variations the article composition again corresponds to the composition in the bulk. Negligible variations are preferably variations in the content of single components of $\pm 1\%$, further preferably $\pm 0.5\%$ each, in comparison to the content in the bulk.

The change of the proportions of the ions which are involved in the ion-exchange process, normally, is not a linear one, as already mentioned above. Rather, the course of the proportions, at least in the case of an ordinary exchange process, can be described by a (complementary) error function. Often, the error function is also called "Gaussian error function". Normally, the abbreviation "erf" represents the error function and the abbreviation "erfc" represents the complementary error function.

The course of the content of an ion may be a result of the exchange process, wherein the proportion of it in the exchange layer, in comparison to the bulk glass layer, is increased (for example $K^+$). At the glass surface (x=0) the content is 100% and it decreases into the direction of the center of the glass based on a complementary error function (erfc). The presentation is chosen such that 100% corresponds to the maximum difference of the proportion of the respective ion compared to the proportion in the bulk, while 0% expresses that there is no difference with respect to the bulk. Thus, the expression 0% does not mean that the proportion of the ion in the respective depth is 0%. Rather, it is expressed that there is no difference with respect to the proportion in the bulk. Thus, the position with the value 0% is not located in the exchange layer, but in the bulk.

The course of the curve for the ions with increased proportions in the exchange layer, compared to the bulk layer, can be described by the following equation:

$$c(x, t) = \mathrm{erfc}\left(\frac{x}{2 \cdot \sqrt{D \cdot t}}\right),$$

wherein x is the relative article depth position, D is the diffusion coefficient and t is the prestressing time (tempering time).

For the ions with reduced proportions in the exchange layer, compared to the bulk layer, the course of the curve can be described by the following equation:

$$c(x, t) = \mathrm{erf}\left(\frac{x}{2 \cdot \sqrt{D \cdot t}}\right) = 1 - \mathrm{erfc}\left(\frac{x}{2 \cdot \sqrt{D \cdot t}}\right),$$

wherein x is the relative article depth position, D is the diffusion coefficient and t is the prestressing time.

The diffusion coefficient D is different for different combinations of the ion species being involved in the exchange and for different temperatures as well as for different materials. The diffusion coefficient D is measured in the unit $m^2/s$. With the help of the following equation from the diffusion coefficient D and the prestressing time t the characteristic depth of penetration $x_c$ can be calculated:

$x_c = 2 \cdot \sqrt{D \cdot t}$

The prestressing time t is the time during which the article is placed in the prestressing bath (tempering bath). This time can be measured in an automated manner or by way of manual time measurement. According to the present invention, the diffusion coefficient D can be determined by a plurality of different methods. Preferably, the diffusion coefficient is calculated with the help of a depth profile of the exchanged ions after a defined prestressing temperature (tempering temperature) and time. This depth profile can, for example, be measured with EDX (energy dispersive X-ray spectroscopy). In an alternative, the ToF-SIMS method (time-of-flight secondary ion mass spectrometry) can be used. In the case of the ToF-SIMS method with an ion beam material is driven out of the article surface and then the composition of the thus generated ions is measured. By the act of driving out material a hole is "drilled" into (the depth of) the article and changes of the ion profile can be detected. Further suitable methods are known by a person skilled in the art.

Thus, for $x=x_c$ the following it true:

$c(x_c)=\mathrm{erfc}(1)\approx15.7\%$

Thus, at a depth of $x=x_c$ the proportion of the ions, in excess to the basic proportion, with increased proportions in the exchange layer, compared to the bulk layer, is about 15.7% of the maximum proportion being present at the glass surface.

Thus, the complementary error function describes the course of the proportion of the ions in the exchange layer, whose proportion in the exchange layer in comparison to the bulk is increased (for example K$^+$). However, by the exchange process not only the proportion of certain ions in the exchange layer in comparison to the bulk is increased. Conversely, the proportion of another ion (for example Na$^+$) is reduced. For clarity reasons the course of the content of this ion with a reduced proportion in comparison to the bulk is not shown. The course follows an error function (erf) and rises from 0% at the surface ($x=0$) to the proportion being present in the bulk.

According to the present invention, the kind of ion with an increased proportion in the exchange layer, compared to the bulk, is referred to as ion$_I$ (for ion$_{Increased}$) and the kind of ion with a reduced proportion in the exchange layer, compared to the bulk, is referred to as ion$_R$ (for ion$_{Reduced}$). Ion$_I$ is preferably K$^+$ and ion$_R$ is preferably Na$^+$. According to the present invention, not every kind of cation with an increased proportion in the exchange layer in comparison to the bulk layer is necessarily called ion$_I$ and not every cation with a reduced proportion in the exchange layer in comparison to the bulk layer is necessarily called ion$_R$.

Instead, the term "ion$_I$" refers only to those kinds of cations with an increased proportion in the exchange layer in comparison to the bulk layer that fulfill the further requirements of the invention, in particular that the ion radius of ion$_I$ is higher than the ion radius of ion$_R$. Kinds of cations with an increased proportion in the exchange layer in comparison to the bulk layer are not called ion$_I$ if the ion radius of such ions is not higher than the ion radius of ion$_R$.

Likewise, the term "ion$_R$" refers only to those kinds of cations with a reduced proportion in the exchange layer in comparison to the bulk layer that fulfill the further requirements of the invention, in particular that the ion radius of ion$_I$ is higher than the ion radius of ion$_R$. Furthermore, the above-described requirements on the different ratios of the proportions of the kind of cation at the article surface, in the bulk layer and in a depth y of the exchange layer have to be fulfilled in order for the respective kind of cation to be ion$_R$ in the sense of the invention.

The article of the invention may for example comprise two different kinds of cations A and B with a reduced proportion in the exchange layer in comparison to the bulk layer, wherein the ion radius of both kinds of cations is smaller as compared to the ion radius of another kind of cation C having an increased proportion in the exchange layer in comparison to the bulk layer. Still A and B are not necessarily ion$_R$ in the sense of the invention. Instead, the further requirements of the invention have to be fulfilled in order for cation A and/or B to qualify as ion$_R$, namely that the ratio $c_{R,surface}$ of the proportion of the cation at the article surface to the proportion of the cation in the bulk layer and the ratio $c_{R,inner}$ of the proportion of the cation in a depth y of the exchange layer to the proportion of the cation in the bulk layer are such that $$\frac{y\cdot\left(-\ln\left(\frac{4-3\cdot c_{R,surface}}{4}\right)\right)}{\ln\left(\frac{4-3\cdot c_{R,surface}}{4-3\cdot c_{R,inner}}\right)}$$

is higher than 5 μm, and that the ratio $c_{R,surface}$ of the proportion of the cation at the article surface to the proportion of the cation in the bulk layer and the ratio of $c_{R,inner}$ of the proportion of the cation in a depth y of the exchange layer to the proportion of the cation in the bulk layer are such that $$\frac{y}{\ln\left(\frac{4-3\cdot c_{R,surface}}{4-3\cdot c_{R,inner}}\right)}$$

is higher than 12 μm. Hence, it is possible that only A, only B or both A and B are ion$_R$ in the sense of the invention. In order for an article to be an article of the invention it is not necessary that both A and B fulfill the indicated requirements on the different ratios of the proportions at the article surface, in the bulk layer and in a depth y of the exchange layer. In particular, the article of the invention may comprise two different kinds of cations A and B with a reduced proportion in the exchange layer in comparison to the bulk layer both having an ion radius being smaller as compared to the ion radius of another kind of cation C having an increased proportion in the exchange layer in comparison to the bulk layer, wherein only one of A and B fulfills the indicated requirements on the different ratios of the proportions at the article surface, in the bulk layer and in a depth y of the exchange layer.

The article of the invention may comprise one kind of cation ion$_R$ or more than one kind of cation ion$_R$, for example two kinds of cations ion$_R$.

An article according to the present invention comprises at least one exchange layer and at least one bulk layer. Preferably, the article comprises exactly two exchange layers and one bulk layer lying in between.

The exchange layer comprises at least one kind of cation ion$_I$ with an increased proportion in comparison to the bulk layer and at least one kind of cation ion$_R$ with a reduced proportion in comparison to the bulk layer. The exchange layer may comprise exactly one kind of cation ion$_I$ with an increased proportion in comparison to the bulk layer and exactly one kind of cation ion$_R$ with a reduced proportion in comparison to the bulk layer. Preferably, ion$_R$ is Na$^+$ Preferably, ion$_I$ is K$^+$. Particularly preferably, ion$_R$ is Na$^+$ and ion$_I$ is K$^+$. In alternative embodiments ion$_R$ is Li$^+$ and ion$_I$ is Na$^+$.

According to the present invention, the ion radius of ion$_I$ is higher than the ion radius of ion$_R$. A person skilled in the art knows the ion radius of most different cations (see, for example, Erwin Riedel, Christoph Janiak: *Anorganische Chemie*, 7$^{th}$ edition, de Gruyter, Berlin 2007). A person skilled in the art in particularly knows that for the ion radii the following is true: $K^+ > Na^+ > Li^+$.

According to the present invention the ratio of the proportion of $ion_R$ at the article surface to the proportion of $ion_R$ in the bulk layer is in a range of 0.4 to 0.8. As described above, the course of the proportion of $ion_R$ in the case of a chemically hardened article, in particularly a chemically hardened glass, preferably follows an error function (erf) and rises from 0% at the surface (x=0) to the proportion being present in the bulk. Thus, after the chemical hardening the ratio of the proportion of $ion_R$ at the article surface to the proportion of $ion_R$ in the bulk layer is zero, because the proportion of $ion_R$ at the article surface is 0%. As also described above, by the tempering a compression stress is generated. This compression stress is connected with an improvement of the bending and/or impact strength of the tempered articles. Now, surprisingly it was found that the bending and/or impact strength can be increased still further, when the generated compression stress layer is removed again, not only in a minimum extent, but in a substantial amount. Such a removal can, for example, be achieved by etching of the tempered article. By the removal the parts of the article surface in which the proportion of $ion_R$ is particularly low are removed. Thus articles, wherein the proportion of $ion_R$ at the article surface is not 0%, are obtained, since the original surface after the chemical hardening has been removed.

According to the present invention, the ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer are such that $$\frac{y \cdot \left(-\ln\left(\frac{4 - 3 \cdot c_{R,surface}}{4}\right)\right)}{\ln\left(\frac{4 - 3 \cdot c_{R,surface}}{4 - 3 \cdot c_{R,inner}}\right)}$$

is higher than 5 μm. Surprisingly, it was found that such articles may have a particularly well bending and/or impact strength and/or scratch resistance. The term $$\frac{y \cdot \left(-\ln\left(\frac{4 - 3 \cdot c_{R,surface}}{4}\right)\right)}{\ln\left(\frac{4 - 3 \cdot c_{R,surface}}{4 - 3 \cdot c_{R,inner}}\right)}$$

is a measure for the extent of the removal achieved by etching of the exchange layer which has been introduced by ion exchange.

As described above, the proportion of the ions with an increased proportion in comparison to the bulk decreases from the surface into the direction of the bulk according to a complementary error function erfc. After the tempering step t and D are fixed quantities. Thus, the following it true:

$$c(x) = \text{erfc}\left(\frac{x}{x_c}\right)$$

It was found, that in the range of x=0 to x=1.2*$x_c$ the formula:

$$c(x) = \frac{4}{3} \cdot \exp\left(-\frac{x}{x_c}\right) - \frac{1}{3}$$

is a good approximation for the complicated error function (see FIG. 2).

As also described above, the proportion of the ions with a reduced proportion compared to the bulk rises from the surface into the direction of the bulk according to an error function erf. Thus, approximately the following is true:

$$c_V(x) = 1 - \text{erfc}\left(\frac{x}{x_c}\right) = \frac{4}{3} \cdot \left(1 - \exp\left(-\frac{x}{x_c}\right)\right)$$

Simple rearrangement makes it possible to approximately determine from the ratio $c_{R,surface}$ of the proportion of $ion_R$ at the article surface to the proportion of $ion_R$ in the bulk layer and the ratio $c_{R,inner}$ of the proportion of $ion_R$ in a depth y (in μm, relative to the article surface) to the proportion of $ion_R$ in the bulk layer with the help of the term $$\frac{y \cdot \left(-\ln\left(\frac{4 - 3 \cdot c_{R,surface}}{4}\right)\right)}{\ln\left(\frac{4 - 3 \cdot c_{R,surface}}{4 - 3 \cdot c_{R,inner}}\right)}$$

how many micrometers of the original exchange layer have been removed.

The ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer may be such that $$\frac{y \cdot \left(-\ln\left(\frac{4 - 3 \cdot c_{R,surface}}{4}\right)\right)}{\ln\left(\frac{4 - 3 \cdot c_{R,surface}}{4 - 3 \cdot c_{R,inner}}\right)}$$

is at least 6 μm, further preferably at least 7 μm, further preferably at least 8 μm, further preferably at least 9 μm, further preferably at least 10 μm, further preferably at least 11 μm, further preferably at least 12 μm. It was shown that such articles may have a particularly well bending and/or impact strength and/or scratch resistance. However, the ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer are preferably such that $$\frac{y \cdot \left(-\ln\left(\frac{4 - 3 \cdot c_{R,surface}}{4}\right)\right)}{\ln\left(\frac{4 - 3 \cdot c_{R,surface}}{4 - 3 \cdot c_{R,inner}}\right)}$$

is at most 60 μm, further preferably at most 55 μm, further preferably at most 50 μm, further preferably at most 47.5 μm, further preferably at most 45 μm, further preferably at most 42.5 μm, further preferably at most 40 μm.

The ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer are preferably such that $$\frac{y \cdot \left(-\ln\left(\frac{4-3 \cdot c_{R,surface}}{4}\right)\right)}{\ln\left(\frac{4-3 \cdot c_{R,surface}}{4-3 \cdot c_{R,inner}}\right)}$$

is in a range of >5 μm to 60 μm, further preferably 6 μm to 55 μm, further preferably 7 μm to 50 μm, further preferably 8 μm to 47.5 μm, further preferably 9 μm to 45 μm, further preferably 10 μm to 42.5 μm, further preferably 11 μm to 40 μm.

The depth y in which the proportion $c_{R,inner}$ of $ion_R$ is determined is preferably in a range of 1 μm to 10 μm, further preferably of 2 μm to 8 μm, further preferably of 3 μm to 5 μm, further preferably of 4 μm. The depth y is the depth relative to the article surface. In other words, at the article surface the following is true: y=0 μm.

The ratio $c_{R,surface}$ of the proportion of $ion_R$ at the article surface to the proportion of $ion_R$ in the bulk layer may be in a range of 0.3 to 0.9. The ratio of the proportion of $ion_R$ at the article surface to the proportion of $ion_R$ in the bulk layer may be at least 0.35, further preferably at least 0.40, further preferably at least 0.45, further preferably at least 0.50, further preferably at least 0.55. The ratio of the proportion of $ion_R$ at the article surface to the proportion of $ion_R$ in the bulk layer may be at most 0.85, further preferably at most 0.80, further preferably at most 0.75, further preferably at most 0.70, further preferably at most 0.65. The ratio of the proportion of $ion_R$ at the article surface to the proportion of $ion_R$ in the bulk layer may be in a range of 0.45 to 0.75, further preferably of 0.50 to 0.70, further preferably of 0.55 to 0.65.

According to the present invention, the ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer are such that $$\frac{y}{\ln\left(\frac{4-3 \cdot c_{R,surface}}{4-3 \cdot c_{R,inner}}\right)}$$

is higher than 12 μm. Surprisingly, it was found that such articles may have a particularly well bending and/or impact strength and/or scratch resistance. The term $$\frac{y}{\ln\left(\frac{4-3 \cdot c_{R,surface}}{4-3 \cdot c_{R,inner}}\right)}$$

is a measure for the extent of the characteristic depth of penetration achieved by tempering. From the above described approximation of the error function $$c_V(x) = \frac{4}{3} \cdot \left(1 - \exp\left(-\frac{x}{x_c}\right)\right)$$

by simple rearrangement follows that it is possible to approximately determine from the ratio $c_{R,surface}$ of the proportion of $ion_R$ at the article surface to the proportion of $ion_R$ in the bulk layer and the ratio $c_{R,inner}$ of the proportion of $ion_R$ in a depth y (in μm, relative to the article surface) to the proportion of $ion_R$ in the bulk layer with the help of the term $$\frac{y}{\ln\left(\frac{4-3 \cdot c_{R,surface}}{4-3 \cdot c_{R,inner}}\right)}$$

the value (in micrometers) of the characteristic depth of penetration $x_c$ achieved by tempering, before the removal by etching.

The ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer may be such that $$\frac{y}{\ln\left(\frac{4-3 \cdot c_{R,surface}}{4-3 \cdot c_{R,inner}}\right)}$$

is at least 13 μm, further preferably at least 14 μm, further preferably at least 15 μm, further preferably at least 16.5 μm, further preferably at least 18 μm, further preferably at least 19.5 μm, further preferably at least 21 μm, further preferably at least 22.5 μm, further preferably at least 24 μm. It was shown that such articles may have a particularly well bending and/or impact strength and/or scratch resistance. However, the ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer are preferably such that $$\frac{y}{\ln\left(\frac{4-3 \cdot c_{R,surface}}{4-3 \cdot c_{R,inner}}\right)}$$

is at most 50 μm, further preferably at most 48 μm, further preferably at most 45 μm, further preferably at most 42 μm, further preferably at most 39 μm, further preferably at most 36 μm, further preferably at most 33 μm, further preferably at most 30 μm, further preferably at most 27 μm.

The ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer are preferably such that $$\frac{y}{\ln\left(\frac{4-3 \cdot c_{R,surface}}{4-3 \cdot c_{R,inner}}\right)}$$

is in a range of >12 μm to 50 μm, further preferably of 13 μm to 48 μm, further preferably of 14 μm to 45 μm, further preferably of 15 μm to 42 μm, further preferably of 16.5 μm to 39 μm, further preferably of 18 μm to 36 μm, further preferably of 19.5 μm to 33 μm, further preferably of 21 μm to 30 μm, further preferably of 22.5 μm to 27 μm.

The depth y in which the proportion $c_{R,inner}$ of $ion_R$ is determined is preferably in a range of 1 μm to 10 μm, further preferably of 2 μm to 8 μm, further preferably of 3 μm to 5 μm, further preferably of 4 μm. The depth y means the depth relative to the article surface. In other words, at the article surface the following is true: y=0 μm.

The ratio $c_{R,surface}$ of the proportion of $ion_R$ at the article surface to the proportion of $ion_R$ in the bulk layer and the ratio $c_{R,inner}$ of the proportion of $ion_R$ in a depth y of the exchange layer to the proportion of $ion_R$ in the bulk layer may be such that for z≥0.2, further preferably for z≥0.18, further preferably for z≥0.16 the following is true:

$$\frac{y}{\ln\left(\frac{4-3\cdot c_{R,surface}}{4-3\cdot c_{R,inner}}\right)}\cdot\left(1+2\cdot z\cdot \ln\left(\frac{4-3\cdot c_{r,surface}}{4}\right)\right) > z\cdot d_E$$

Here, $d_E$ is the final thickness of the etched article. It was shown that such articles may have an excellent bending and/or impact strength.

The depth difference between a first depth position of the exchange layer at which the proportion of $ion_R$ is 0.8 times the proportion of $ion_R$ in the bulk layer and a second depth position of the exchange layer at which the proportion of $ion_R$ is 0.843 times the proportion of $ion_R$ in the bulk layer may be at least 2.5% of the article thickness d. As described above, the proportion of $ion_R$ in a chemically hardened article, in particular a chemically hardened glass, rises from the article surface to the proportion present in the bulk. Preferably, the rise of the proportion of $ion_R$ into the direction of the center of the article is not a linear one, but according to an error function (erf). Thus, the extent of the increase of the proportion of $ion_R$ into the direction of the center of the glass normally cannot be described by a simple slope. Therefore, it seems to be advantageous to describe the extent of the increase of the proportion of $ion_R$ into the direction of the center of the glass by the distance of the proportion of $ion_R$ at two determined depth positions of the exchange layer. A higher distance means a lower increase of the proportion of $ion_R$ into the direction of the center of the glass.

In such embodiments as depth positions, on the one hand, the position at which the proportion of $ion_R$ is 0.8 times the proportion of $ion_R$ in the bulk layer, and, on the other hand, the position at which the proportion of $ion_R$ is 0.843 times the proportion of $ion_R$ in the bulk layer are used.

The second depth position is the position x at which the following is true: $x=x_c$, when the course of the proportion of $ion_R$ from the surface into the direction of the center of the article follows an error function erf. As described above for the proportion of $ion_I$ which follows a complementary error function erfc, at a depth of $x=x_c$ the proportion of $ion_I$ in excess of the basic proportion in the bulk layer is about 15.7% of the maximum proportion being present at the glass surface. On the other hand, the proportion of $ion_R$ at $x=x_c$ in the case of the assumption of an error function erf is reduced in an amount of about 15.7% with respect to the proportion of $ion_R$ in the bulk layer. Thus, the proportion of $ion_R$ at $x=x_c$ in this case is approximately 0.843 times the proportion of $ion_R$ in the bulk layer.

As the first depth position the position at which the proportion of $ion_R$ is 0.8 times the proportion of $ion_R$ in the bulk layer is chosen. In embodiments in which the proportion of $ion_R$ at the article surface is 0.8 times the proportion of $ion_R$ in the bulk layer the first depth position is located at the article surface. In embodiments in which the proportion of $ion_R$ at the article surface is lower than 0.8 times the proportion of $ion_R$ in the bulk layer the first depth position is not located at the article surface, but between the article surface and the second depth position.

Surprisingly, it was found that the bending and/or impact strength and/or scratch resistance of the articles are particularly high, when the depth difference between a first depth position of the exchange layer at which the proportion of $ion_R$ is 0.8 times the proportion of $ion_R$ in the bulk layer and a second depth position of the exchange layer at which the proportion of $ion_R$ is 0.843 times the proportion of $ion_R$ in the bulk layer is at least 2.5% of the article thickness d. Particularly preferably, the mentioned depth difference is even at least 2.75%, more preferably at least 3%, more preferably at least 3.25%, further preferably at least 3.5%, further preferably at least 3.75%, further preferably at least 4%, further preferably at least 4.5%, further preferably at least 5% of the article thickness d. However, the mentioned depth difference should also not be extremely high. The depth difference between a first depth position of the exchange layer at which the proportion of $ion_R$ may be 0.8 times the proportion of $ion_R$ in the bulk layer and a second depth position of the exchange layer at which the proportion of $ion_R$ is 0.843 times the proportion of $ion_R$ in the bulk layer is at most 12%, more preferably at most 11.75%, more preferably at most 11.5%, more preferably at most 11.25%, more preferably at most 11%, more preferably at most 10.5%, more preferably at most 10%, more preferably at most 9.5%, more preferably at most 9% of the article thickness d. The depth difference between a first depth position of the exchange layer at which the proportion of $ion_R$ is 0.8 times the proportion of $ion_R$ in the bulk layer and a second depth position of the exchange layer at which the proportion of $ion_R$ may be 0.843 times the proportion of $ion_R$ in the bulk layer is in a range of 2.5% to 12%, more preferably of 2.75% to 11.75%, more preferably of 3% to 11.5%, more preferably of 3.25% to 11.25%, more preferably of 3.5% to 11%, more preferably of 3.75% to 10.5%, more preferably of 4% to 10%, more preferably of 4.5% to 9.5%, more preferably of 5% to 9% of the article thickness d.

The depth difference between a first depth position of the exchange layer at which the proportion of $ion_R$ is 0.8 times the proportion of $ion_R$ in the bulk layer and a second depth position of the exchange layer at which the proportion of $ion_R$ is 0.843 times the proportion of $ion_R$ in the bulk layer may be in a range of 1 μm to 100 μm, further preferably in a range of 1.25 μm to 75 μm, further preferably in a range of 1.5 μm to 50 μm, further preferably of 1.75 μm to 40 μm, further preferably in a range of 2 μm to 25 μm, further preferably in a range of 2.5 μm to 20 μm, further preferably in a range of 3 μm to 15 μm, further preferably in a range of 3.5 μm to 10 μm, further preferably of 4 μm to 8 μm.

The depth difference between a first depth position of the exchange layer at which the proportion of $ion_R$ is 0.8 times the proportion of $ion_R$ in the bulk layer and a second depth position of the exchange layer at which the proportion of $ion_R$ may be 0.843 times the proportion of $ion_R$ in the bulk layer is in a range of 1 μm to 100 μm and of 2.5% to 12% of the article thickness d, further preferably in a range of 1.25 μm to 75 μm and of 2.75% to 11.75% of the article thickness d, further preferably in a range of 1.5 μm to 50 μm and of 3% to 11.5% of the article thickness d, further preferably of 1.75 µm to 40 µm and of 3.25% to 11.25% of the article thickness d, further preferably in a range of 2 µm to 25 µm and of 3.5% to 11% of the article thickness d, further preferably in a range of 2.5 µm to 20 µm and of 3.75% to 10.5% of the article thickness d, further preferably in a range of 3 µm to 15 µm and of 4% to 10% of the article thickness d, further preferably in a range of 3.5 µm to 10 µm and of 4.5% to 9.5% of the article thickness d, further preferably in a range of 4 µm to 8 µm and of 5% to 9% of the article thickness d.

In the 2-point bending test the article according to the present invention, in particular the glass according to the present invention, may have a 63.2% bending strength of at least 1700 MPa, further preferably at least 1800 MPa, further preferably at least 1900 MPa, further preferably at least 2000 MPa, further preferably at least 2200 MPa, further preferably at least 2400 MPa, further preferably at least 2600 MPa, further preferably at least 2800 MPa, further preferably at least 3000 MPa, further preferably at least 3200 MPa. The 63.2% bending strength is determined by determining the probability of failure as a function of the tensile stress generated by the bending. The data of the 2-point bending test can be fitted with the help of a Weibull distribution, and from that the 63.2% bending strength can be determined. According to the present invention, the 63.2% bending strength is the tensile stress at which the probability of failure in the Weibull distribution is 1−(1/e). The fitting is preferably conducted with the help of the least squares method or the maximum likelihood method. The least squares method is particularly preferable.

In the 2-point bending test the article according to the present invention, in particular the glass according to the present invention, may have a 10% bending strength of at least 800 MPa, further preferably at least 900 MPa, further preferably at least 1000 MPa, further preferably at least 1100 MPa, further preferably at least 1200 MPa, further preferably at least 1300 MPa, further preferably at least 1400 MPa, further preferably at least 1500 MPa, further preferably at least 1600 MPa, further preferably at least 1700 MPa. The 10% bending strength is determined by determining the probability of failure as a function of the tensile stress generated by the bending. The data of the 2-point bending test can be fitted with the help of a Weibull distribution, and from that the 10% bending strength can be determined. According to the present invention, the 10% bending strength is the tensile stress at which the probability of failure in the Weibull distribution is 10%. The fitting is preferably conducted with the help of the least squares method or the maximum likelihood method. The least squares method is particularly preferable.

In the 2-point bending test the article according to the present invention, in particular the glass according to the present invention, may have a 1% bending strength of at least 500 MPa, further preferably at least 600 MPa, further preferably at least 700 MPa, further preferably at least 800 MPa, further preferably at least 900 MPa, further preferably at least 1000 MPa, further preferably at least 1100 MPa, further preferably at least 1200 MPa, further preferably at least 1300 MPa, further preferably at least 1400 MPa. The 1% bending strength is determined by determining the probability of failure as a function of the tensile stress generated by the bending. The data of the 2-point bending test can be fitted with the help of a Weibull distribution, and from that the 1% bending strength can be determined. According to the present invention, the 1% bending strength is the tensile stress at which the probability of failure in the Weibull distribution is 1%. The fitting is preferably conducted with the help of the least squares method or the maximum likelihood method. The least squares method is particularly preferable.

1% bending strengths are shown in for a glass with a characteristic depth of penetration $x_c$ of 16 µm and for a glass with a characteristic depth of penetration $x_c$ of 24 µm. It can be seen that an enhancement of the bending strength only occurs in the case of an etching removal of more than 5 µm. In the case of a removal of 10 µm or more the effect is even more distinct.

The measurement of the bending strength is conducted by way of a 2-point bending test such as described by Matthewson et al. (Journal of the American Ceramic Society, Vol. 69, No. 11, pages 815-821, November 1986). Matthewson describes 2-point bending tests with glass fibers. However, the considerations made there can be transferred to the flat articles of the present invention. According to the present invention, the bending strength is determined by inserting the article between two parallel guide plates which are then moved towards each other, until the article breaks. From the distance of the plates at the event of fracture the bending radius of the article at the event of fracture can be determined, from which in turn the tensile stress at the event of fracture can be determined, such as described by Matthewson et al. Preferably, the tests are conducted such that one "main faces" of the panes—that which is curved in a convex manner—touches both guide plates. Preferably, here the long edges of the samples are curved. The geometries of the samples are preferably 20 mm×100 mm. For the determination of the Weibull distribution preferably 30 samples each are tested. The calculation of the tensile stress is preferably conducted with the help of the formula of Matthewson.

A simplified model of the stresses occurring in the glass during bending is shown in FIG. 3. In this model the total stress $\sigma_{total}$ is the sum of the tensile stress due to bending $\sigma_{tensile}$, the compression stress being introduced by the chemical tempering $\sigma_{CS}$ and the tensile stress $\sigma_{CT}$ being directed against $\sigma_{CS}$:

$$\sigma_{total}(X)=\sigma_{tensile}(X)+\sigma_{CT}+\sigma_{CS}(X)$$

Tensile stresses are illustrated positive and compression stresses are illustrated negative. The occurring stresses are shown as a function of the depth position x. When a glass is bent, then at the outer side of the curvature a convex surface results and at the inner side of the curvature a concave surface results. The position x=0 shown in FIG. 3 corresponds to the surface of the bent glass on the convex (outer) side. On this side the curvature generates a tensile stress $\sigma_{tensile}$. On the other hand, on the concave (inner) surface of the bent glass a compression stress results (not shown). The illustration shown in FIG. 3 is based on the assumption of an exchange layer with a characteristic depth of penetration $x_c$=7 µm and a tensile stress due to the bending $\sigma_{tensile}$ of 200 MPa. In addition, a constant tensile stress $\sigma_{CT}$ is assumed, for which the following is true:

$$\sigma_{CT} = -CS \cdot \frac{x_c}{0.843 \cdot d},$$

wherein CS is the compression stress $\sigma_{CS}$ at the article surface, $x_c$ is the characteristic depth of penetration and d is the article thickness.

In the model which is the basis of FIG. 3 at the glass surface the compression stress $\sigma_{CS}$ being introduced by the chemical hardening has the value CS and then decreases in a linear manner into the direction of the center of the glass. For $x \leq x_\sigma/0.843$ the following is true:

$$\sigma_{CS}(x) = CS \cdot \left(1 - \frac{0.843 \cdot x}{x_\sigma}\right)$$

For $x > x_\sigma/0.843$ the following is assumed:

$$\sigma_{CS}(X) = 0.$$

Also for the tensile stress due to bending $\sigma_{tensile}$ a linear decrease from the maximum value being achieved at the glass surface $\sigma_B$ into the direction of the center of the glass is assumed. The decrease is such that for $x=d/2$ the tensile stress $\sigma_{tensile}$ is zero:

$$\sigma_{tensile}(x) = \sigma_B \cdot \left(1 - \frac{2}{d}x\right)$$

With respect to the total stress $\sigma_{total}$ it can be seen that the introduced compression stress $\sigma_{CS}$ results in the fact that at the glass surface despite the tensile stress due to bending $\sigma_{tensile}$ in total a compression stress prevails so that the glass withstands the bending load. Only at a depth x of about 4 µm the algebraic sign of the total stress $\sigma_{total}$ becomes positive (dashed line a0).

The article according to the present invention may have improved impact strength.

The impact strength may be tested by dropping a defined object from a given height vertically with defined orientation (preferably with the tip downwards) onto the article, wherein on the side of the article being opposite to the object a plastic has been laminated. The plastic film preferably consists of a base polyethylene foil having a thickness of 200 to 300 µm and an adhesive layer (PSA, "pressure sensitive adhesive") having a thickness of 2 to 10 µm. The adhesive layer is positioned between the polyethylene layer and the article. Preferably, the article is glued onto the polyethylene foil with the help of the adhesive PSA layer. For example, the polyethylene foil can be tied with the article via the adhesive PSA layer by at first providing a respective layer arrangement and then laminating this layer arrangement into the final layer composite by exerting pressure. For example, a (metal) roll can be rolled over the layer arrangement for exerting pressure and thus for supporting the formation of the adhesive bond.

For the test the article is laid with the polyethylene layer downwards onto a solid base, such as for example a table or a block of stainless steel. Then the object is dropped from a defined height onto the non-coated side of the article. When the article does not break by the impact of the object, then the height from which the object is dropped is increased step by step, until the article breaks. The drop height of the object at which the fracture has taken place is the measured value via which the impact strength of the article is evaluated.

For the test the defined object is clamped in a testing machine. The testing machine moves to the predetermined height. Then the article is placed in the apparatus such that the object vertically impinges in defined orientation (preferably with the tip) on the article, when it is dropped. When the article does not break, then the drop height of the object is increased (preferably by 5 mm), and the article is shifted a bit for again testing a site at which before no impact has occurred. This is continued so long, until the article breaks.

Per article type several samples are tested so that different article types can be compared via the statistical distributions. Per article type, preferably, 10 to 50, further preferably 20 to 40, further preferably 25 to 35 samples are tested. The impact strength is specified as the mean drop height of the object at which the samples of an article type broke. The average value is addressed. When, for example, ten samples of an article type were tested and five samples broke in the case of a drop height of 45 mm and five samples broke in the case of a drop height of 50 mm, then the mean drop height at which the article broke is 47.5 mm.

The defined object which is dropped onto the article is an oblong rod-shaped object with a tip of tungsten carbide. The object may have a maximum diameter of 8 to 12 mm. Preferably, the tip has a diameter of 0.5 mm to 0.75 mm. The object is dropped onto the article such that the object impinges on the article with the tip of tungsten carbide ahead. The drop height is the distance between the tip of tungsten carbide and the article surface. Preferably, the object has a length of 130 to 150 mm and a weight of 4 to 7 g. The stiffness of the object is preferably 250 to 350 N/mm. In alternative embodiments the stiffness of the object is preferably 10 to 300 N/mm, further preferably 20 to 200 N/mm, further preferably 50 to 100 N/mm.

Preferably, the impact strength test is conducted at a temperature of 22° C. to 28° C. and a relative air humidity of 20% to 50%.

With respect to the adhesive layer, the polyethylene layer and the tip of tungsten carbide, preferably, the following characteristic numbers apply:

| Material | Elastic modulus | Poisson number | Density |
|---|---|---|---|
| Adhesive layer | 500 to 750 MPa | 0.4 to 0.6 | 1,200 to 1,600 kg/m³ |
| Polyethylene layer | 800 to 1,500 MPa | 0.4 to 0.6 | 700 to 1,100 kg/m³ |
| Tungsten carbide | 500 to 1,000 GPa | 0.2 to 0.3 | 10,000 to 20,000 kg/m³ |

Preferably, the article has an impact strength such that the mean drop height of the object from which the object falls onto the article and through which a fracture of the article is caused is at least 40 mm, further preferably at least 42 mm, further preferably at least 44 mm, further preferably at least 46 mm, further preferably at least 48 mm, further preferably at least 50 mm, further preferably at least 52 mm, wherein the object has a length of 130 to 150 mm, a weight of 4 to 7 g and a stiffness of 250 to 350 N/mm as well as a tip of tungsten carbide with a diameter of 0.5 to 0.75 mm, wherein the object impinges with the tip of tungsten carbide ahead on the article, wherein on the side of the article being opposite to the object an adhesive PSA layer with a thickness of 2 to 10 µm and a polyethylene layer with a thickness of 200 to 300 µm are present and wherein the adhesive PSA layer is arranged between the article and the polyethylene layer.

The article of the present invention may have an advantageous fracturing behavior. A fracturing behavior is regarded as being advantageous if a relatively low number of cracks is formed upon a defined load, for example in the impact strength test described above. A low number of cracks is advantageous because the article will give rise to a low number of fragments upon damage which in turn reduces the risk of injuries.

Preferably, the fracturing behavior is tested by dropping a defined object from a given height vertically with defined orientation (preferably with the tip downwards) onto the article, wherein on the side of the article being opposite to the object a plastic has been laminated. The plastic film preferably consists of a base polyethylene foil having a thickness of 200 to 300 µm and an adhesive layer (PSA, "pressure sensitive adhesive") having a thickness of 2 to 10 µm. The adhesive layer is positioned between the polyethylene layer and the article. Preferably, the article is glued onto the polyethylene foil with the help of the adhesive PSA layer. For example, the polyethylene foil can be tied with the article via the adhesive PSA layer by at first providing a respective layer arrangement and then laminating this layer arrangement into the final layer composite by exerting pressure. For example, a (metal) roll can be rolled over the layer arrangement for exerting pressure and thus for supporting the formation of the adhesive bond.

For the test, the article is laid with the polyethylene layer downwards onto a solid base, such as for example a table or a block of stainless steel. Then the object is dropped from a defined height onto the non-coated side of the article. When the article does not break by the impact of the object, then the height from which the object is dropped is increased step by step, until the article breaks. As described above, the drop height of the object at which the fracture has taken place is the measured value via which the impact strength of the article is evaluated. This drop height is also called the "breakage height" or "fracturing height". The number of cracks formed upon breakage is determined by visual inspection. Counted are only cracks having a length of at least 1000 µm. Experimental results are shown.

For the fracturing test, the defined object is clamped in a testing machine. The testing machine moves to the predetermined height. Then the article is placed in the apparatus such that the object vertically impinges in defined orientation (preferably with the tip) on the article, when it is dropped. When the article does not break, then the drop height of the object is increased (preferably by 5 mm), and the article is shifted a bit for again testing a site at which before no impact has occurred. This is continued so long, until the fracturing height is reached so that the article breaks.

Preferably, per article type several samples are tested so that different article types can be compared via the statistical distributions. Per article type, preferably, 10 to 50, further preferably 20 to 40, further preferably 25 to 35 samples are tested. The number of cracks is preferably specified as the average number of cracks of the different samples of a certain article type. When, for example, two samples of an article type are tested and one sample has 46 cracks and the other samples has 54 cracks, then the average number of cracks is 50.

The defined object which is dropped onto the article is an oblong rod-shaped object with a tip of tungsten carbide. Preferably, the object has a maximum diameter of 8 to 12 mm. Preferably, the tip has a diameter of 0.5 mm to 0.75 mm. The object is dropped onto the article such that the object impinges on the article with the tip of tungsten carbide ahead. The drop height is the distance between the tip of tungsten carbide and the article surface. Preferably, the object has a length of 130 to 150 mm and a weight of 4 to 7 g. The stiffness of the object is preferably 250 to 350 N/mm. In alternative embodiments the stiffness of the object is preferably 10 to 300 N/mm, further preferably 20 to 200 N/mm, further preferably 50 to 100 N/mm.

Preferably, the fracturing test is conducted at a temperature of 22° C. to 28° C. and a relative air humidity of 20% to 50%.

With respect to the adhesive layer, the polyethylene layer and the tip of tungsten carbide, preferably, the following characteristic numbers apply:

| Material | Elastic modulus | Poisson number | Density |
|---|---|---|---|
| Adhesive layer | 500 to 750 MPa | 0.4 to 0.6 | 1,200 to 1,600 kg/m³ |
| Polyethylene layer | 800 to 1,500 MPa | 0.4 to 0.6 | 700 to 1,100 kg/m³ |
| Tungsten carbide | 500 to 1,000 GPa | 0.2 to 0.3 | 10,000 to 20,000 kg/m³ |

Preferably, the article has a fracturing behavior in the fracturing test such that when an object falls onto the article from the fracturing height and thereby causes breakage of the article the number of cracks that are formed and that have a length of at least 1000 µm is at most 40, more preferably at most 35, more preferably at most 30, more preferably at most 25, more preferably at most 20, more preferably at most 15, more preferably at most 10, more preferably at most 5, wherein the object has a length of 130 to 150 mm, a weight of 4 to 7 g and a stiffness of 250 to 350 N/mm as well as a tip of tungsten carbide with a diameter of 0.5 to 0.75 mm, wherein the object impinges with the tip of tungsten carbide ahead on the article, wherein on the side of the article being opposite to the object an adhesive PSA layer with a thickness of 2 to 10 µm and a polyethylene layer with a thickness of 200 to 300 µm are present and wherein the adhesive PSA layer is arranged between the article and the polyethylene layer.

As described above, the fracturing height is preferably at least 40 mm, further preferably at least 42 mm, further preferably at least 44 mm, further preferably at least 46 mm, further preferably at least 48 mm, further preferably at least 50 mm, further preferably at least 52 mm.

The present invention also relates to a method for increasing the bending strength and/or the impact strength of an article of transparent and brittle material having a starting thickness $d_A$ comprising the following steps:

a) chemically hardening of the article by ion exchange, wherein on at least one side, preferably on both sides of the article an exchange layer with a characteristic depth of penetration $x_c$ is generated, wherein $x_c$ is higher than 12 µm, and b) etching of the chemically hardened article to a final thickness $d_E$, with $d_E < d_A$, wherein by the etching from the exchange layer more than 5 µm are removed.

The method may comprise further steps. According to some embodiments the method comprises a further etching step before the step of chemical hardening.

Preferably, $x_c$ is at least 13 µm, further preferably at least 14 µm, further preferably at least 15 µm, further preferably at least 16.5 µm, further preferably at least 18 µm, further preferably at least 19.5 µm, further preferably at least 21 µm, further preferably at least 22.5 µm, further preferably at least 24 µm. It was shown that such articles may have a particularly well bending and/or impact strength and/or scratch resistance.

Preferably, $x_c$ is at most 50 µm, further preferably at most 48 µm, further preferably at most 45 µm, further preferably at most 42 µm, further preferably at most 39 µm, further preferably at most 36 µm, further preferably at most 33 µm, further preferably at most 30 µm, further preferably at most 27 µm.

Preferably, $x_c$ is in a range of >12 µm to 50 µm, further preferably of 13 µm to 48 µm, further preferably of 14 µm to 45 µm, further preferably of 15 µm to 42 µm, further preferably of 16.5 µm to 39 µm, further preferably of 18 µm to 36 µm, further preferably of 19.5 µm to 33 µm, further preferably of 21 µm to 30 µm, further preferably of 22.5 µm to 27 µm.

Preferably, by etching from the exchange layer at least 6 µm, further preferably at least 7 µm, further preferably at least 8 µm, further preferably at least 9 µm, further preferably at least 10 µm, further preferably at least 11 µm, further preferably at least 12 µm are removed. It was shown that such articles may have a particularly well bending and/or impact strength.

Preferably, by etching from the exchange layer at most 60 µm, further preferably at most 55 µm, further preferably at most 50 µm, further preferably at most 47.5 µm, further preferably at most 45 µm, further preferably at most 42.5 µm, further preferably at most 40 µm are removed.

Preferably, by etching from the exchange layer >5 µm to 60 µm, further preferably 6 µm to 55 µm, further preferably 7 µm to 50 µm, further preferably 8 µm to 47.5 µm, further preferably 9 µm to 45 µm, further preferably 10 µm to 42.5 µm, further preferably 11 µm to 40 µm are removed.

The ion exchange may take place in a bath of molten salt between the glass surface and the salt bath. Such a bath is also referred to as prestressing bath. For the exchange pure salt melts, such as for example molten $KNO_3$, can be used. But also salt mixtures or mixtures of salts with further components can be used. A desired compression prestress profile can also be generated by ion implantation.

The chemical tempering may be conducted in a $KNO_3$ bath at temperatures of between 360° C. and 490° C. The prestressing time is preferably adjusted such that the characteristic depth of penetration $x_c$ is in a range of >12 µm to 50 µm. But it is not absolutely necessary to adjust the characteristic depth of penetration $x_c$ via the prestressing time. It is also possible to select a certain prestressing time and to adjust, for example, the prestressing temperature such that $x_c$ is in a range of >12 µm to 50 µm.

Particularly preferably, $x_c$ is in a range of $0.16*d_A$ to $\frac{1}{3}*d_A$, further preferably in a range of $0.18*d_A$ to $0.3*d_A$, more preferably of $\frac{1}{5}*d_A$ to $\frac{1}{4}*d_A$.

Preferably, by etching from the exchange layer at least $0.25*x_c$, further preferably at least $0.3*x_c$, further preferably more than $0.3*x_c$, further preferably at least $0.4*x_c$, further preferably at least $0.5*x_c$, further preferably at least $0.6*x_c$, further preferably at least $0.7*x_c$, further preferably at least $0.8*x_c$, further preferably at least $0.9*x_c$, further preferably at least $1.0*x_c$ are removed. Preferably, by etching from the exchange layer at most $1.2*x_c$, further preferably at most $1.1*x_c$, further preferably at most $1.0*x_c$, further preferably at most $0.9*x_c$, further preferably at most $0.85*x_c$ are removed. Preferably, by etching from the exchange layer between $0.25*x_c$ and $1.2*x_c$, further preferably between $0.3*x_c$ and $1.1*x_c$, further preferably between $0.4*x_c$ and $1.0*x_c$, further preferably between $0.5*x_c$ and $0.9*x_c$, further preferably between $0.6*x_c$ and $0.85*x_c$ are removed.

Preferably, the characteristic depth of penetration $x_c$ corresponds to at least the 1.0 fold, further preferably at least the 1.5 fold, further preferably at least the 2.0 fold, further preferably at least the 3.0 fold of the microcrack depth a. So a particularly positive effect onto the bending and/or impact strength of an article can be achieved. For determining the microcrack depth a, preferably on one or several reference samples a strength test is conducted. Then from the measured fracture stress $\sigma_{fracture}$, the fracture toughness $K_{Ic}$ and the geometry factor g via the following formula the microcrack depth a can be calculated:

$$\sigma_{fracture} = \frac{K_{Ic}}{g \cdot \sqrt{a}}$$

With this information then $x_c$ can be adjusted accordingly.

According to the present invention, the fracture toughness $K_{Ic}$ is the fracture toughness under tensile loads (mode I). This fracture toughness is specified in MPa·√m and is preferably measured with the help of the "precracked beam method" being described in the ASTM standard C1421-15 (p. 9 ff.). The fracture toughness $K_{Ic}$ is preferably determined with the help of one or several reference articles. Preferably, the articles which are used for the determination of the fracture toughness $K_{Ic}$ are not prestressed, in particularly not chemically tempered. Preferably, $K_{Ic}$ is higher than 0.4 MPa·√m. Further preferably, $K_{Ic}$ is at least 0.45 MPa·√m, further preferably at least 0.5 MPa·√m, further preferably at least 0.6 MPa·√m, further preferably at least 0.7 MPa·√m, further preferably at least 0.8 MPa·√m. Preferably, $K_{Ic}$ is at most 100 MPa·√m, further preferably at most 75 MPa·√m, further preferably at most 50 MPa·√m, further preferably at most 10 MPa·√m, further preferably at most 8 MPa·√m, further preferably at most 5 MPa·√m. Preferably, $K_{Ic}$ is in a range of >0.4 MPa·√m to 100 MPa·√m, further preferably of 0.45 MPa·√m to 75 MPa·√m, further preferably of 0.5 MPa·√m to 50 MPa·√m, still further preferably of 0.6 MPa·√m to 10 MPa·√m, further preferably of 0.7 to 8 MPa·√m, further preferably of 0.8 to 5 MPa·√m.

It was found that the bending and/or impact strength can be increased still further, when the generated compression stress layer is removed again, not only in a minimum extent, but in a substantial amount. Therefore, the method according to the present invention comprises the step of etching of the chemically hardened article to a final thickness $d_E$, with $d_E < d_A$, wherein by the etching from the exchange layer at least $0.4*x_c$ and at most $0.85*x_c$ are removed. Further preferably, from the exchange layer at least $0.45*x_c$, more preferably $0.50*x_c$, further preferably at least $0.55*x_c$ are removed. However, the removal should not be extremely high. Preferably, the removal is at most $0.80*x_c$, more preferably at most $0.75*x_c$, more preferably at most $0.70*x_c$.

Preferably, the removal is 6 µm to 15 µm, further preferably 8 µm to 12 µm.

Preferably, by etching from the exchange layer at least the 0.7 fold, further preferably at least the 1.0 fold, further preferably at least the 1.5 fold, further preferably at least the 2.0 fold of the microcrack depth a is removed.

The etching may be conducted with the help of an etching solution, in particularly in an etching bath. Preferably, the etching solution contains ammonium bifluoride or hydrofluoric acid in a concentration of 0.1 to 25% (w/v), further preferably of 0.2 to 20% (w/v), further preferably of 0.5 to 15% (w/v), further preferably 1 to 10% (w/v). Preferably, in addition to ammonium bifluoride or hydrofluoric acid the etching solution contains a further acid, particularly preferably $HNO_3$, HCl or $H_2SO_4$. Preferably, the etching solution contains said further acid in a concentration of 0.1 to 25% (w/v), further preferably of 0.2 to 20% (w/v), further preferably of 0.5 to 15% (w/v), further preferably 1 to 10% (w/v). Preferably, the ratio of the concentration of ammonium bifluoride or hydrofluoric acid, on the one hand, and further acid, on the other hand, is in a range of 0.8 to 1.2, further preferably of 0.9 to 1.1, further preferably of 0.95 to 1.05.

The etching may be conducted for a period of time of 0.1 to 120 minutes, further preferably 0.2 to 60 minutes, further preferably of 0.5 to 30 minutes, further preferably of 1 to 10 minutes, still further preferably of 2 to 8 minutes. The etching time may be chosen dependently on the desired material removal.

The temperature during the etching may be 10° C. to 40° C., further preferably 15° C. to 30° C., still further preferably 20° C. to 25° C.

The method according to the present invention is a method for providing an article according to the present invention.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
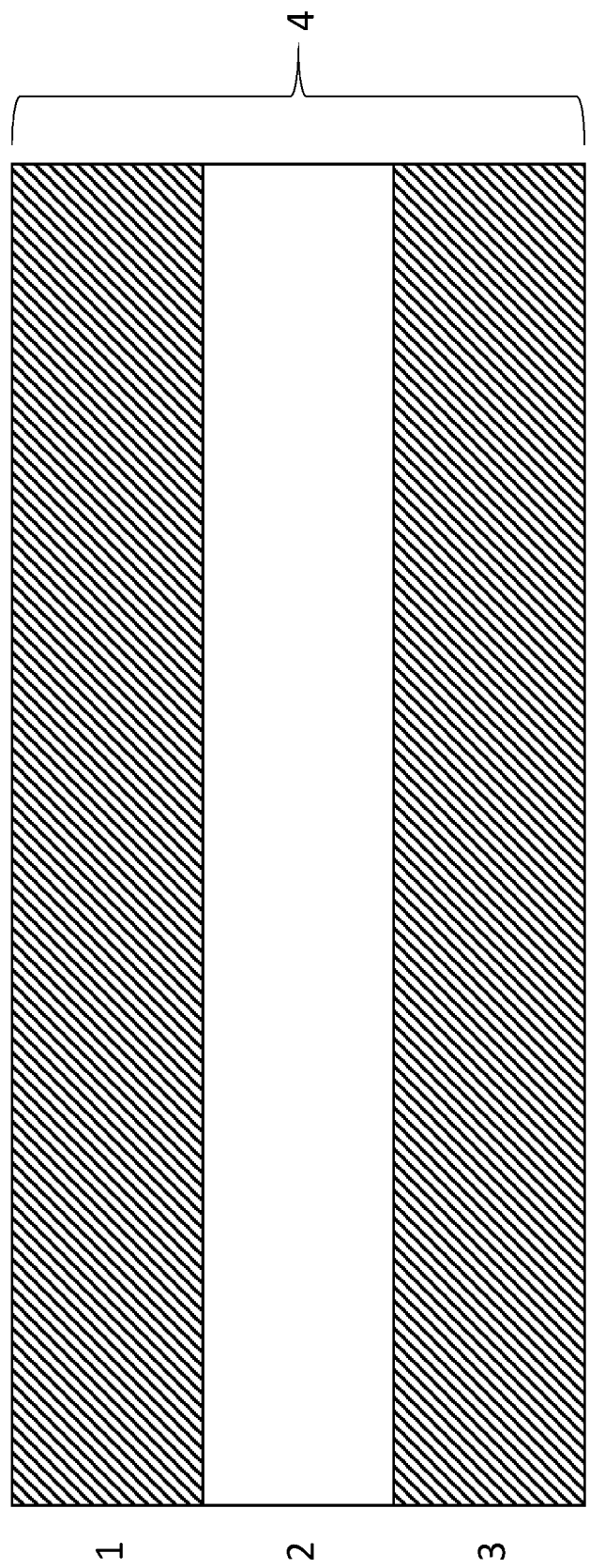
FIG. 1 shows schematically a side view of a chemically tempered glass.

FIG. 1 shows schematically a side view of a chemically tempered glass. The glass comprises three layers 1, 2 and 3, wherein the sum of the respective thicknesses thereof is the glass thickness d which is indicated by the reference sign 4. The layers 1 and 3 which are hatched are exchange layers. The layer 2 which is not hatched is the bulk glass layer.

Figure 2:
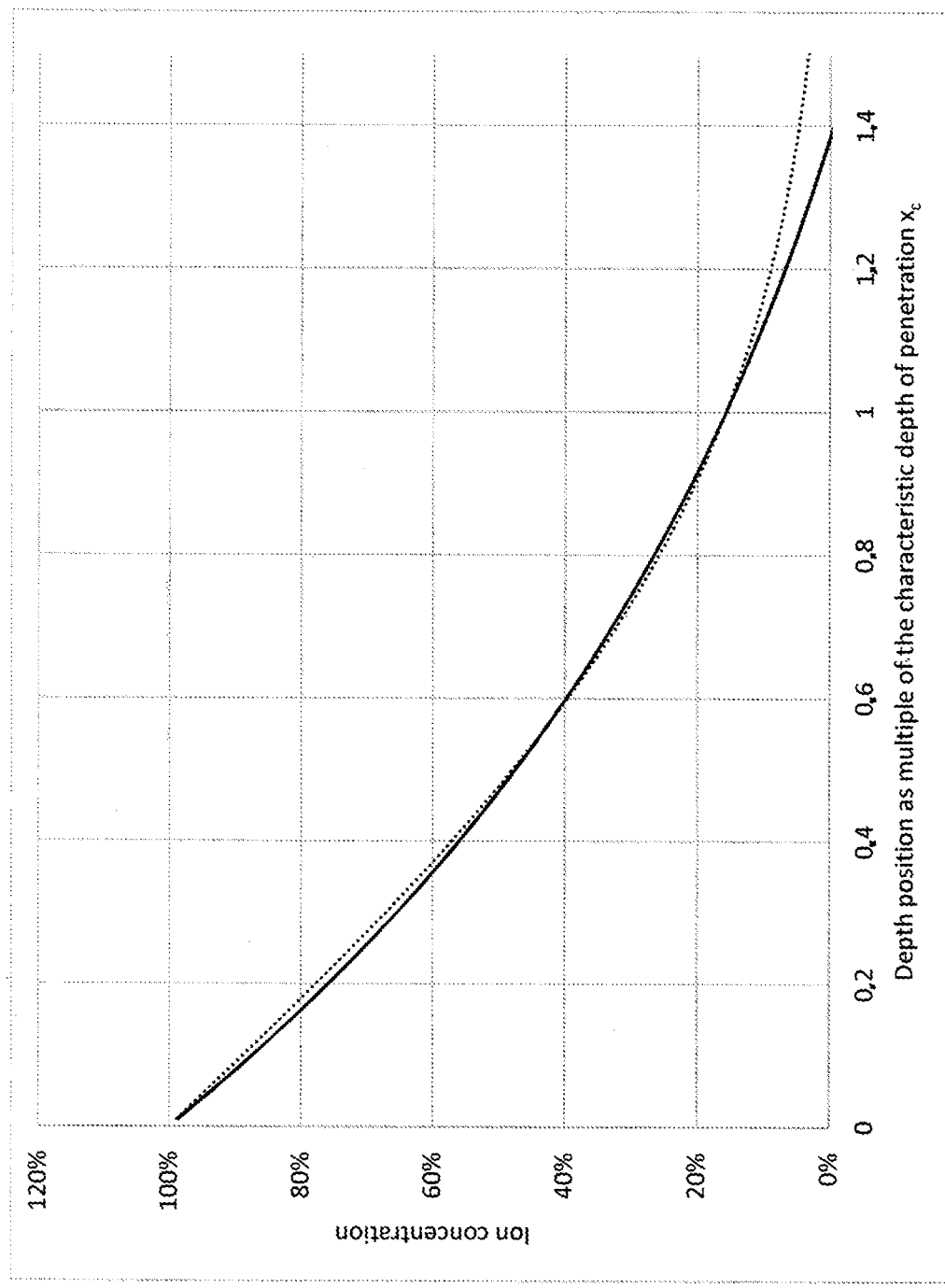
FIG. 2 shows exemplarily the course (due to the exchange process) of the concentration of an ion $ion_f$.

FIG. 2 shows exemplarily the course (due to the exchange process) of the concentration of an ion $ion_f$, wherein the proportion thereof in the exchange layer in comparison to the bulk glass layer is increased (for example K$^+$). On the y-axis the ion concentration is specified and on the x-axis the relative depth position in the glass is specified. A relative depth position in the glass of 0 corresponds to the surface of the glass. There, the concentration of the ion reaches a maximum (here shown as 100%). The x position is the distance from the glass surface. This distance can also be referred to as depth position y or depth y. It can be seen that the concentration of the ion from the surface into the direction of the center of the glass, following a complementary error function (erfc), decreases.

Here, the depth position in the glass is specified relatively to $x_c$, wherein $x_c$ according to the definition can be calculated from the parameters diffusion coefficient and prestressing time which are decisive for the prestressing process. Accordingly, the concentration profile shown in FIG. 2 describes the general course after a single-step prestressing process. In comparison to the complementary error function erfc (dotted line) also the exponential function used for approximation (continuous line) is shown.

Figure 3:
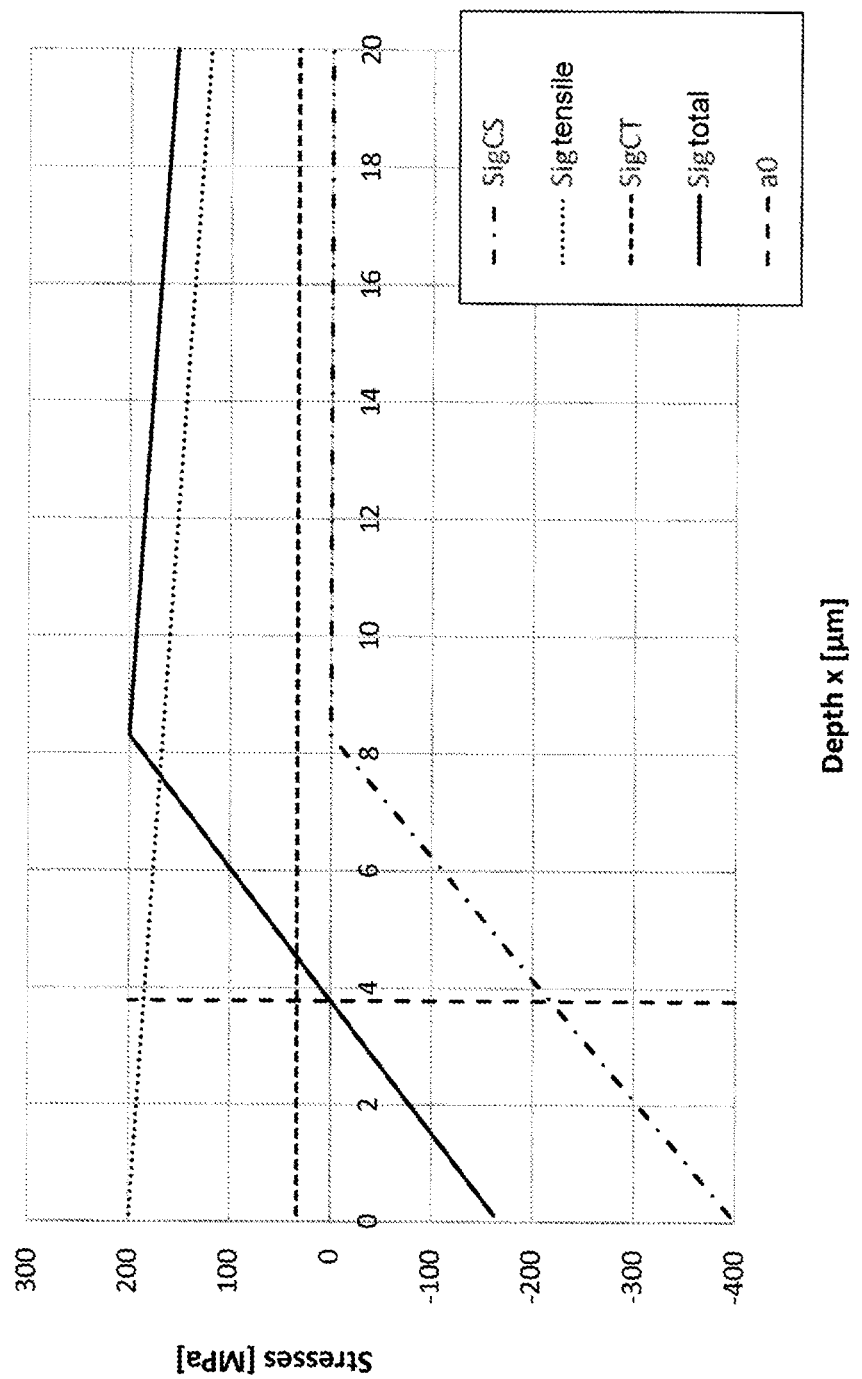
FIG. 3 shows a simplified model of the stresses which occur.

FIG. 3 shows a simplified model of the stresses which occur, when a glass is bent. In this model the total stress $\sigma_{total}$ (continuous line) is the sum of the tensile stress due to bending $\sigma_{tensile}$, (dotted line), the compression stress being introduced by the chemical tempering $\sigma_{CS}$ (dotted-dashed line) and the tensile stress $\sigma_{CT}$ (dashed line) being directed against $\sigma_{CS}$. Tensile stresses are illustrated positive and compression stresses are illustrated negative. The occurring stresses are shown as a function of the depth position x. The vertical dashed line (a0) highlights the depth position at which the total stress $\sigma_{total}$ is zero. The illustration shown in FIG. 3 is based on the assumption of an exchange layer with a characteristic depth of penetration $x_c=7$ μm and a tensile stress due to the bending $\sigma_{tensile}$ of 200 MPa. For the sake of convenience, in this model the introduced compression stress $\sigma_{CS}$ was linearly approximated.

Figure 4A:
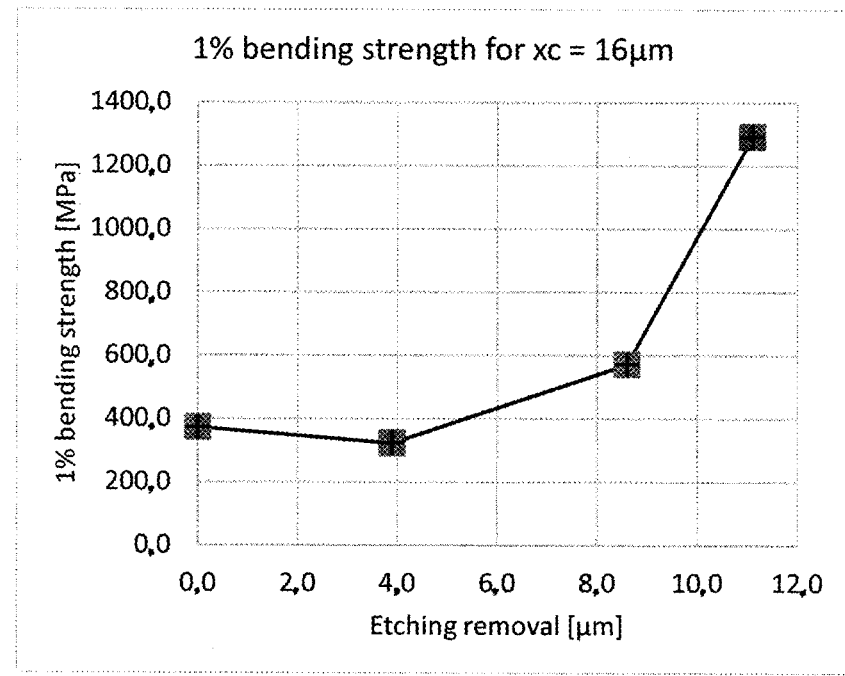
FIG. 4A shows the results of a 2-point bending test for glasses with a characteristic depth of penetration $x_c$.
Figure 4B:
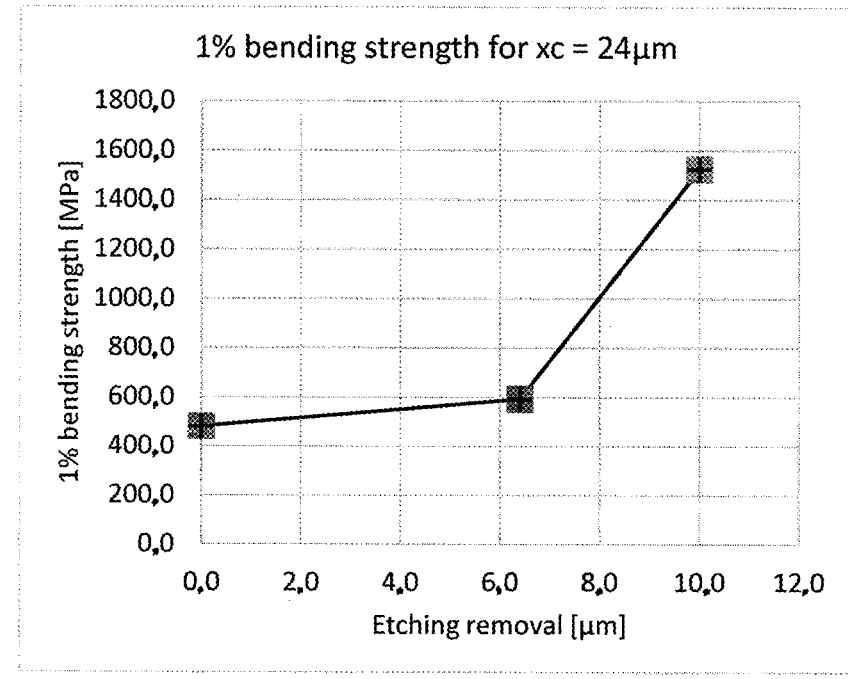
FIG. 4B shows the results of a 2-point bending test for glasses with another characteristic depth of penetration $x_c$.

FIGS. 4A and 4B shows the results of a 2-point bending test for glasses with different characteristic depth of penetration $x_c$. For each point of measurement 30 single measurements were utilized. The shown values are the values of the Weibull distributions (1% strengths) which were fitted with the help of the 30 single measurements. In the case of the glasses shown in FIG. 4A the characteristic depth of penetration $x_c$ which has been achieved by the chemical tempering was 16 μm and in the case of the glasses shown in FIG. 4B this value was 24 μm. On the y-axis the determined 1% bending strength is shown in MPa. On the x-axis the extent of the removal by etching which has been conducted after the tempering is plotted, wherein the removal is shown in μm.

Figure 5A:
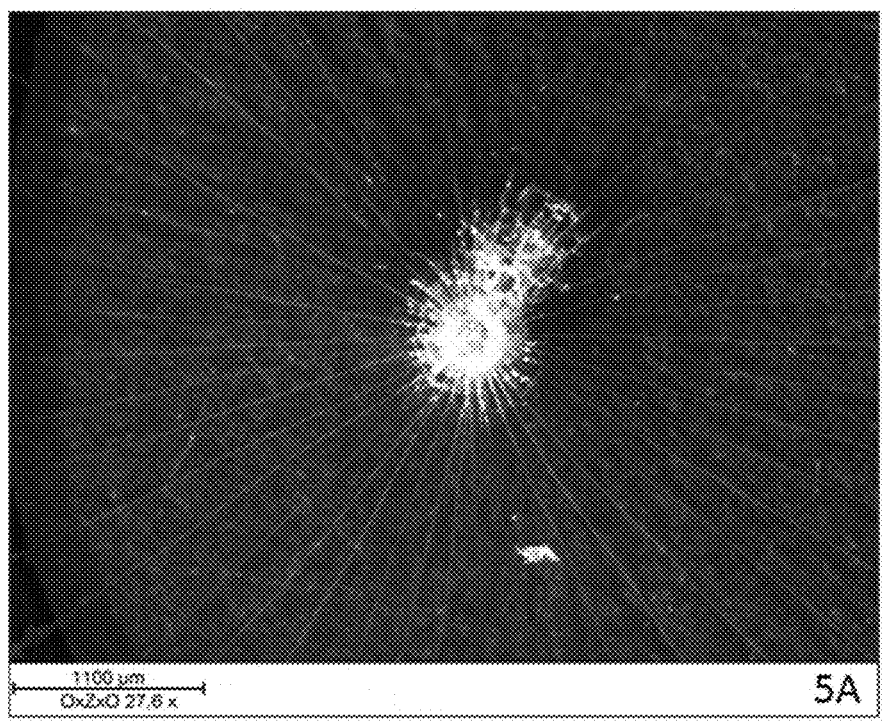
FIG. 5A shows a photograph of a fracturing test done with a sample type.
Figure 5B:
FIG. 5B shows a photograph of a fracturing test done with another sample type.

FIGS. 5A-5B show photographs of a fracturing test done with two different sample types. The glasses shown were subjected to an etching step, wherein on each of both main side faces material was removed, prior to the fracturing test. The etching removal A was 4 μm on each of both main side faces for the glass shown in FIG. 5A. The etching removal A was 19 μm on each of both main side faces for the glass shown in FIG. 5B.

Figure 6:
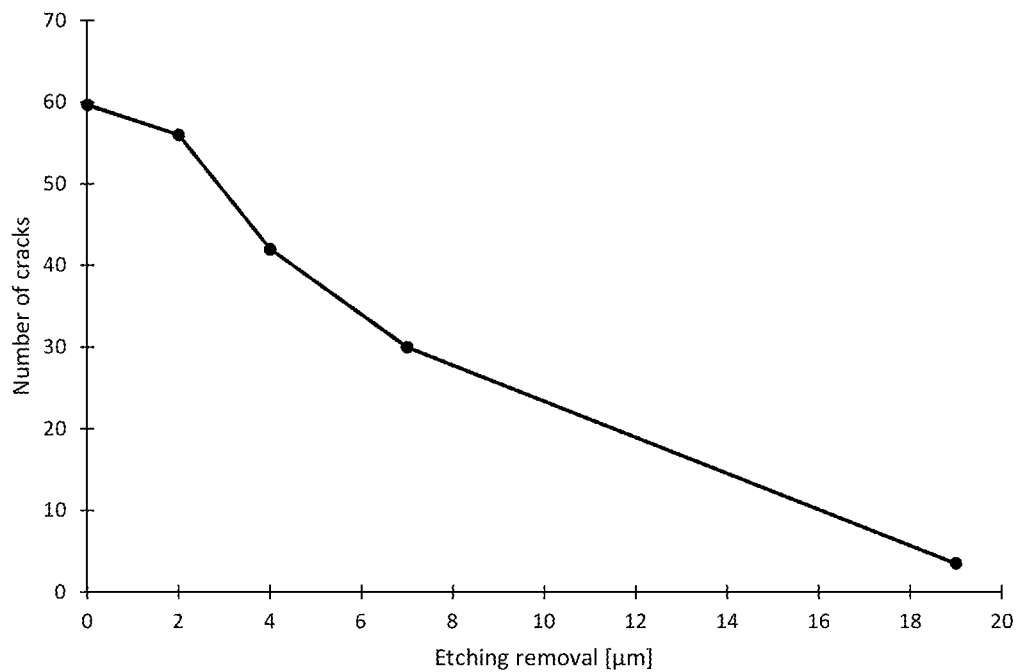
FIG. 6 is a graph showing the dependence of the number of cracks observed in the fracturing test (y-axis) on etching removal A (x-axis)
Figure 7:
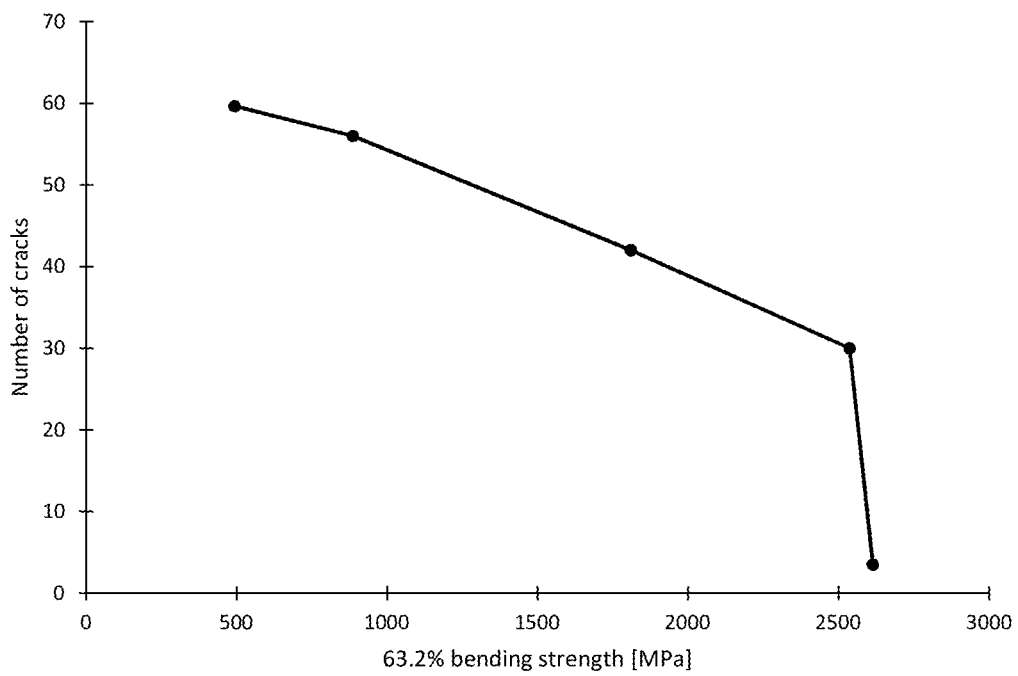
FIG. 7 shows the dependence of number of cracks (y-axis) on the 63.2% bending strength (x-axis).

FIG. 6 is a graph showing the dependence of the number of cracks observed in the fracturing test (y-axis) on etching removal A (x-axis). It can be seen that the number of cracks decreases with increasing removal A. FIG. 7 shows the dependence of number of cracks (y-axis) on the 63.2% bending strength (x-axis). It can be seen that the number of cracks decreases with increasing 63.2% bending strength.

EXAMPLES

The following examples are provided for further explaining the present invention.

1. Provision of a Starting Glass

With the help of a downdraw method a thinnest glass with a length of 600 mm, a width of 500 mm and with a thickness d of 100 μm was provided. The glass comprised the following components in % by weight:

| Component | Proportion (% by weight) |
|---|---|
| $SiO_2$ | 61 |
| $Al_2O_3$ | 17 |
| $Na_2O$ | 12 |
| $K_2O$ | 4 |
| MgO | 4 |
| $ZrO_2$ | 2 |

The glass may have an elastic modulus of higher than 70,000 MPa, a Poisson number of 0.22 and a density of about 2500 kg/m³.

On one of the main sides at defined sites the glass was scored with a diamond for being able to break the glass in a targeted manner for achieving the desired sample sizes. After the scoring step the glass was broken such that samples with a length l of 100 mm, a width b of 20 mm and a thickness d of 10 µm were achieved.

2. Chemical Tempering

The glass was tempered on both sides in a $KNO_3$ bath at a temperature of 380° C. over a period of time of 7.8 hours. On both sides of the glass the characteristic depth of penetration $x_c$ was 24 µm each and thus 24% of the starting thickness $d_A$ of the glass which was 100 µm such as described above.

In a further test it was tempered in a $KNO_3$ bath at a temperature of 380° C. over a period of time of 3.5 hours on both sides such that the characteristic depth of penetration $x_c$ on both sides of the glass was 16 µm each and thus 16% of the starting thickness $d_A$ of the glass.

In a further test it was tempered in a $KNO_3$ bath at a temperature of 380° C. over a period of time of 56 minutes on both sides such that the characteristic depth of penetration $x_c$ on both sides of the glass was 8 µm each and thus 8% of the starting thickness $d_A$ of the glass.

3. Etching Step

After the chemical tempering the glass was subjected to an etching step. It was etched at room temperature in an etching bath with an etching solution which contained 2% (w/v) of ammonium bifluoride and 2% (w/v) of nitric acid.

By the etching step on each of both main side faces material was removed. Depending on the duration of the etching step which was between 7 minutes and 39 minutes different amounts of material were removed. The results are summarized in the following table.

| Characteristic depth of penetration $x_c$ in µm | Removal A in µm | Ratio A/$x_c$ in % (rounded) |
|---|---|---|
| 8 | 1.9 | 24 |
| 8 | 3.5 | 44 |
| 8 | 5.7 | 71 |
| 8 | 7.8 | 98 |
| 16 | 3.9 | 24 |
| 16 | 8.6 | 54 |
| 16 | 11.1 | 69 |
| 24 | 6.4 | 27 |
| 24 | 10 | 42 |

Thus, for the glasses with a characteristic depth of penetration $x_c$ of 8 µm four different amounts of removal were realized. For the glasses with a characteristic depth of penetration $x_c$ of 16 µm three different removals were realized. For the glasses with a characteristic depth of penetration $x_c$ of 24 µm two different removals were realized. As control from the different tempered glasses also non-etched samples were retained.

4. 2-Point Bending Test

The determination of the bending strength was achieved by way of a 2-point bending test such as described by Matthewson et al. (Journal of the American Ceramic Society, Vol. 69, No. 11, pages 815-821, November 1986). The bending strength was measured by inserting the tempered and etched glass between two parallel guide plates which were then moved towards each other, until the article broke. The tests were conducted such that one "main faces" of the glass panes—that which is curved in a convex manner—touched both guide plates. Here, the long edges of the samples were curved. The geometries of the samples were 20 mm×100 mm such as described above. For the determination of the Weibull distribution 30 samples each were tested.

From the distance of the plates at the event of fracture the bending radius of the glass at the event of fracture was determined. From the bending radius at the event of fracture in turn the tensile stress at the event of fracture was determined, such as described by Matthewson et al. A Weibull distribution of the probability of fracture as a function of the tensile stress was obtained (not shown). In FIGS. 4A-4B the 1% bending strength for the samples with a characteristic depth of penetration $x_c$ of 16 µm and 24 µm is shown as the tensile stress at which the probability of failure in the Weibull distribution is 1%. For the samples with a characteristic depth of penetration $x_c$ of 8 µm no increase of the bending strength was obtained by the etching removal (not shown).

Comparable results were also achieved with a glass of the following composition:

| Component | Proportion (% by weight) |
|---|---|
| $SiO_2$ | 64 |
| $B_2O_3$ | 9 |
| $Al_2O_3$ | 4 |
| $Na_2O$ | 6 |
| $K_2O$ | 7 |
| ZnO | 6 |
| $TiO_2$ | 4 |

Thus, the results are not limited to certain compositions.

5. Impact Strength

A glass with a thickness of 100 µm was chemically tempered so that the characteristic depth of penetration $x_c$ on both sides of the glass was 24 µm each and thus 24% of the starting thickness $d_A$ of the glass, such as described in the examples 1 and 2. After the tempering the glass was subjected to an etching step, wherein on each of both main side faces material was removed, such as described in example 3. On each of both main side faces the removal A was 10 µm each which corresponds to about 42% of $x_c$. Thus, after the etching step the glass had a final thickness $d_E$ of 80 µm. The glass corresponds to the glass shown in FIG. 4B with a removal of about 42%.

The impact strength was tested according to the method described above. A defined object was dropped from a predetermined height vertically with the tip downwards onto the glass, wherein on the side of the glass opposite to the object a plastic has been laminated. The plastic film was a base polyethylene foil with a thickness of 245 µm and an adhesive PSA layer with a thickness of 5 µm. The adhesive layer was located between the polyethylene layer and the glass. The glass was glued onto the polyethylene foil with the help of the adhesive PSA layer. The polyethylene foil was tied with the glass via the adhesive PSA layer by at first providing a respective layer arrangement and then laminating it into the final layer composite by exerting pressure.

For the test the glass was laid with the polyethylene layer downwards onto a block of stainless steel. Then the object was dropped from a defined height onto the non-coated side of the glass. The height from which the object was dropped was increased step by step, until the glass broke. The drop height of the object at which the fracture had taken place is the measured value via which the impact strength of the glass is evaluated. As starting height a height of 5 mm was chosen. The drop height is the distance between the tip of the object and the glass surface.

For the test the defined object was clamped in a testing machine. The testing machine moved to the predetermined height of 5 mm. Then the glass was placed in the apparatus and the object was dropped onto the glass from a height of 5 mm. Since the glass was not broken, the drop height of the object was increased by 5 mm and the glass was shifted a bit for again testing a site at which before no impact has occurred. This was continued so long, until the article broke.

The defined object which was dropped onto the glass was an oblong rod-shaped object with a tip of tungsten carbide. The tip had a diameter of 0.515 mm. The object was dropped onto the glass such that the object impinged on the glass with the tip of tungsten carbide ahead. The object had a length of 138.5 mm and a weight of 6.46 g. The stiffness of the object was preferably 300 N/mm.

During the measurement the temperature was 23.5° C. and the relative air humidity was 40%.

With respect to the adhesive layer, the polyethylene layer and the tip of tungsten carbide the following characteristic numbers applied:

| Material | Elastic modulus | Poisson number | Density |
| --- | --- | --- | --- |
| Adhesive layer | 700 MPa | 0.48 | 1,400 kg/m$^3$ |
| Polyethylene layer | 1,000 MPa | 0.48 | 940 kg/m$^3$ |
| Tungsten carbide | 680 GPa | 0.25 | 15,700 kg/m$^3$ |

In total 32 samples of the glass were tested for obtaining a statistical distribution. The following distribution was obtained:

| Drop height of the object at which the glass broke [mm] | Number of the samples |
| --- | --- |
| 35 | 1 |
| 40 | 3 |
| 45 | 3 |
| 50 | 6 |
| 55 | 15 |
| 60 | 4 |

The drop height at which the glass broke was for 15 of 32 samples 55 mm. The average value was 51.7 mm and the standard deviation was 6.4 mm.

On the other hand, in the case of other samples which were not subjected to the etching step according to the present invention the glass already broke at a mean drop height of 20 mm.

6. Fracturing Behavior

Glasses with a thickness of 70 µm were chemically tempered so that the characteristic depth of penetration $x_c$ on both sides of the glass was 20 µm each and thus 28.6% of the starting thickness $d_A$ of the glasses, such as described in the examples 1 and 2. After the tempering the glasses were subjected to an etching step, wherein on each of both main side faces material was removed, such as described in example 3. Removal A was different for different sample types.

In sample type 1, the etching step was omitted (removal A=0 µm). Sample type 1 served as a control. The 63.2% bending strength was determined to be about 500 MPa.

In sample type 2, on each of both main side faces the removal A was 2 µm each which corresponds to about 10% of $x_c$. Thus, after the etching step the glass had a final thickness $d_E$ of 66 µm. The 63.2% bending strength was determined to be about 900 MPa.

In sample type 3, on each of both main side faces the removal A was 4 µm each which corresponds to about 20% of $x_c$. Thus, after the etching step the glass had a final thickness $d_E$ of 62 µm. The 63.2% bending strength was determined to be about 1800 MPa.

In sample type 4, on each of both main side faces the removal A was 7 µm each which corresponds to about 35% of $x_c$. Thus, after the etching step the glass had a final thickness $d_E$ of 56 µm. The 63.2% bending strength was determined to be about 2500 MPa.

In sample type 5, on each of both main side faces the removal A was 19 µm each which corresponds to about 95% of $x_c$. Thus, after the etching step the glass had a final thickness $d_E$ of 32 µm. The 63.2% bending strength was determined to be about 2600 MPa.

Sample types 1 to 3 are comparative examples. Sample types 4 and 5 are in accordance with the present invention.

The fracturing behavior was tested according to the method described above. A defined object was dropped from a predetermined height vertically with the tip downwards onto the glass, wherein on the side of the glass opposite to the object a plastic has been laminated. The plastic film was a base polyethylene foil with a thickness of 245 µm and an adhesive PSA layer with a thickness of 5 µm. The adhesive layer was located between the polyethylene layer and the glass. The glass was glued onto the polyethylene foil with the help of the adhesive PSA layer. The polyethylene foil was tied with the glass via the adhesive PSA layer by at first providing a respective layer arrangement and then laminating it into the final layer composite by exerting pressure.

For the test, the glass was laid with the polyethylene layer downwards onto a block of stainless steel. Then the object was dropped from a defined height onto the non-coated side of the glass. The height from which the object was dropped was increased step by step, until the fracturing height was reached and the glass broke. The fracturing height is thus the drop height of the object at which the fracture had taken place. As starting height a height of 5 mm was chosen. The drop height is the distance between the tip of the object and the glass surface.

For the test, the defined object was clamped in a testing machine. The testing machine moved to the predetermined height of 5 mm. Then the glass was placed in the apparatus and the object was dropped onto the glass from a height of 5 mm. Since the glass was not broken, the drop height of the object was increased by 5 mm and the glass was shifted a bit for again testing a site at which before no impact has occurred. This was continued so long, until the article broke (fracturing height).

The defined object which was dropped onto the glass was an oblong rod-shaped object with a tip of tungsten carbide. The tip had a diameter of 0.515 mm. The object was dropped onto the glass such that the object impinged on the glass with the tip of tungsten carbide ahead. The object had a length of 138.5 mm and a weight of 6.46 g. The stiffness of the object was preferably 300 N/mm.

During the measurement the temperature was 23.5° C. and the relative air humidity was 40%.

With respect to the adhesive layer, the polyethylene layer and the tip of tungsten carbide the following characteristic numbers applied:

| Material | Elastic modulus | Poisson number | Density |
| --- | --- | --- | --- |
| Adhesive layer | 700 MPa | 0.48 | 1,400 kg/m³ |
| Polyethylene layer | 1,000 MPa | 0.48 | 940 kg/m³ |
| Tungsten carbide | 680 GPa | 0.25 | 15,700 kg/m³ |

The results of the experiments are shown in FIGS. 5 to 7. The experiments show that the number of cracks decreases with increasing removal A (FIG. 6). FIG. 5 shows photographs for exemplary comparison of the fracture behavior of sample types 3 and 5 having removal A of 4 μm and 19 μm, respectively.

Particularly interesting is the comparison of sample types 4 and 5 with respect to the dependence of number of cracks on the 63.2% bending strength (FIG. 7). Even though the 63.2% bending strength of sample types 4 and 5 is very similar, the number of cracks is drastically reduced in sample type 5 as compared to sample type 4. Thus, the removal A appears to be more relevant with respect to determining the number of cracks (FIG. 6) as compared to the 63.2% bending strength (FIG. 7), at least for high 63.2% bending strengths above 2500 MPa.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

LIST OF REFERENCE SIGNS 1 exchange layer
2 bulk glass layer
3 exchange layer
4 glass thickness d

What is claimed is:

1. An article of transparent and brittle material having an article surface, the article comprising:
at least one exchange layer and at least one bulk layer, the at least one exchange layer includes at least one kind of cation $ion_I$ with an increased proportion compared to the at least one bulk layer and at least one kind of cation $ion_R$ with a reduced proportion compared to the at least one bulk layer, the article having a thickness d of at most 100 μm,
wherein an ion radius of $ion_I$ is higher than an ion radius of $ion_R$, a ratio $c_{R,surface}$ of the proportion of $ion_R$ at the article surface to the proportion of $ion_R$ in the at least one bulk layer and the ratio $c_{R,inner}$ of the proportion of $ion_R$ in a depth y of the at least one exchange layer to the proportion of $ion_R$ in the at least one bulk layer are such that $$\frac{y\left(-\ln\left(\frac{4-3\cdot c_{R,surface}}{4}\right)\right)}{\ln\left(\frac{4-3\cdot c_{R,surface}}{4-3\cdot c_{R,inner}}\right)}$$

is higher than 5 μm, and
wherein the ratio $c_{R,surface}$ of the proportion of $ion_R$ at the article surface to the proportion of $ion_R$ in the at least one bulk layer and the ratio $c_{R,inner}$ of the proportion of $ion_R$ in a depth y of the at least one exchange layer to the proportion of $ion_R$ in the at least one bulk layer are such that $$\frac{y}{\ln\left(\frac{4-3\cdot c_{R,surface}}{4-3\cdot c_{R,inner}}\right)}$$

is higher than 12 μm.

2. The article of claim 1, wherein the transparent and brittle material is glass.

3. The article of claim 1, wherein $ion_R$ is $Na^+$.

4. The article of claim 1, wherein the article includes exactly two exchange layers and one bulk layer lying in between.

5. The article of claim 1, wherein the article in a 2-point bending test shows a 63.2% bending strength of at least 1700 MPa.

6. The article of claim 1, wherein the article has an impact strength such that a mean drop height of an object which drops onto the article and at which the article breaks is at least 40 mm, wherein the object has a length of 130 to 150 mm, a weight of 4 to 7 g and a stiffness of 250 to 350 N/mm as well as a tip of tungsten carbide with a diameter of 0.5 to 0.75 mm, wherein the object with the tip of tungsten carbide ahead impinges on the article, wherein on a side of the article opposite to the object an adhesive PSA layer with a thickness of 2 to 10 μm and a polyethylene layer with a thickness of 200 to 300 μm are present and wherein the adhesive PSA layer is arranged between the article and the polyethylene layer.

7. The article of claim 1, wherein the article has a fracturing behavior in a fracturing test such that when an object falls onto the article from a fracturing height and thereby causes breakage of the article a number of cracks that are formed and that have a length of at least 1000 μm is at most 40, wherein the object has a length of 130 to 150 mm, a weight of 4 to 7 g and a stiffness of 250 to 350 N/mm as well as a tip of tungsten carbide with a diameter of 0.5 to 0.75 mm, wherein the object impinges with the tip of tungsten carbide ahead on the article, wherein on a side of the article being opposite to the object an adhesive PSA layer with a thickness of 2 to 10 μm and a polyethylene layer with a thickness of 200 to 300 μm are present and wherein the adhesive PSA layer is arranged between the article and the polyethylene layer.

8. An article of transparent and brittle material, the article comprising:
at least one exchange layer and at least one bulk layer, the at least one exchange layer includes at least one kind of cation $ion_I$ with an increased proportion compared to the at least one bulk layer and at least one kind of cation $ion_R$ with a reduced proportion compared to the at least one bulk layer, the article having a thickness d of at most 100 μm, wherein the article has a fracturing behavior in a fracturing test such that when an object falls onto the article from a fracturing height and thereby causes breakage of the article a number of cracks that are formed and that have a length of at least 1000 μm is at most 40, wherein the object has a length of 130 to 150 mm, a weight of 4 to 7 g and a stiffness of 250 to 350 N/mm as well as a tip of tungsten carbide with a diameter of 0.5 to 0.75 mm, wherein the object impinges with the tip of tungsten carbide ahead on the article, wherein on the side of the article being opposite to the object an adhesive PSA layer with a thickness of 2 to 10 μm and a polyethylene layer with a thickness of 200 to 300 μm are present and wherein the adhesive PSA layer is arranged between the article and the polyethylene layer.

9. The article of claim 8, wherein the transparent and brittle material is a glass or a glass ceramic.

10. The article of claim 9, wherein the article is chemically hardened.

11. The article of claim 8, wherein the article has an impact strength such that a mean drop height of an object which drops onto the article and at which the article breaks is at least 40 mm, wherein the object has a length of 130 to 150 mm, a weight of 4 to 7 g and a stiffness of 250 to 350 N/mm as well as a tip of tungsten carbide with a diameter of 0.5 to 0.75 mm, wherein the object with the tip of tungsten carbide ahead impinges on the article, wherein on the side of the article opposite to the object an adhesive PSA layer with a thickness of 2 to 10 μm and a polyethylene layer with a thickness of 200 to 300 μm are present and wherein the adhesive PSA layer is arranged between the article and the polyethylene layer.

* * * * *

UNITED STATES PATENT AND TRADEMARK OFFICE
CERTIFICATE OF CORRECTION

PATENT NO. : 11,242,283 B2
APPLICATION NO. : 16/401676
DATED : February 8, 2022
INVENTOR(S) : Markus Heiß-Chouquet et al.

It is certified that error appears in the above-identified patent and that said Letters Patent is hereby corrected as shown below:

On the Title Page

Immediately after "WO WO-2016037343 A1 * 3/2016 .....C03C 23/0025" under item (56) FOREIGN PATENT DOCUMENTS, but right before "*cited by examiner", please insert:

--OTHER PUBLICATIONS

B.R. Lawn and D.B. Marshall, "Hardness, Toughness, and Brittleness: An Indentation Analysis", Journal of the American Ceramic Society, 1979, Vol. 62, No. 7-8, pages 347-350 (4 pages).

Jeetendra Sehgal and Setsuro Ito, "Brittleness of Glass" Journal of Non-Crystalline Solids 253, 1999, pages 126-132 (7 pages)

"Standard Test Methods for Determination of Fracture Toughness of Advanced Ceramics at Ambient Temperature" described in ASTM International, ASTM-Norm C1421-15, p. 9 ff. (33 pages).

M. John Matthewson and Charles R. Kurkjian, "Strength Measurement of Optical Fibers by Bending", J. Am. Ceram. Soc., 69 [11], pages 815-821, 1986 (7 pages).

Erwin Riedel and Christoph Janiak, "Anorganische Chemie", 7th edition, de Gruyter, Berlin, 2007, including an English translation (8 pages).--.

Signed and Sealed this
Twenty-fifth Day of March, 2025

Coke Morgan Stewart
*Acting Director of the United States Patent and Trademark Office*